United States Patent [19]

Kawakami

[11] Patent Number: 4,695,990
[45] Date of Patent: Sep. 22, 1987

[54] AUTOCHANGER TYPE DISC PLAYER

[75] Inventor: Hiroshi Kawakami, Fujisawa, Japan

[73] Assignee: Kabushiki Kaisha Toshiba, Japan

[21] Appl. No.: 836,160

[22] Filed: Mar. 4, 1986

Related U.S. Application Data

[62] Division of Ser. No. 618,937, Jun. 8, 1984, Pat. No. 4,601,026.

[30] Foreign Application Priority Data

Jun. 13, 1983 [JP] Japan .................................. 58-105281

[51] Int. Cl.$^4$ ........................ G11B 17/04; G11B 17/22
[52] U.S. Cl. .......................................... 369/38; 369/36
[58] Field of Search ........................ 369/36, 37, 38, 39

[56] References Cited

U.S. PATENT DOCUMENTS

| | | | |
|---|---|---|---|
| 4,502,133 | 2/1985 | Siryj et al. | 369/38 |
| 4,504,936 | 3/1985 | Faber et al. | 369/39 |
| 4,527,262 | 7/1985 | Manto | 369/38 |
| 4,601,026 | 7/1986 | Kawakami | 369/38 |

OTHER PUBLICATIONS

Megadoc, a Modular System, J. A. de Vos, *Phillips Technical Review*, vol. 39, 1980, No. 12, pp. 329–343.

Primary Examiner—Steven L. Stephan
Attorney, Agent, or Firm—Finnegan, Henderson, Farabow, Garrett & Dunner

[57] ABSTRACT

An autochanger type optical compact disc player includes a tray for holding a large number of discs in close proximity, a disc selection mechanism for selecting a disc from the tray, a disc port for entering a disc from the outside of the player, a disc playback mechanism for playing a disc, a first loading mechanism for transferring a selected disc from the tray to the disc playback mechanism, a second disc loading mechanism for transferring a disc from the port to the disc playback mechanism, an unloading mechanism for selectively returning a disc to the tray or to the port, and a control section for controlling operations of the player. A disc is returned from the tray by a roller for contacting the edge of the disc during movement through a limited arc to impart rotational force to the disc.

9 Claims, 48 Drawing Figures

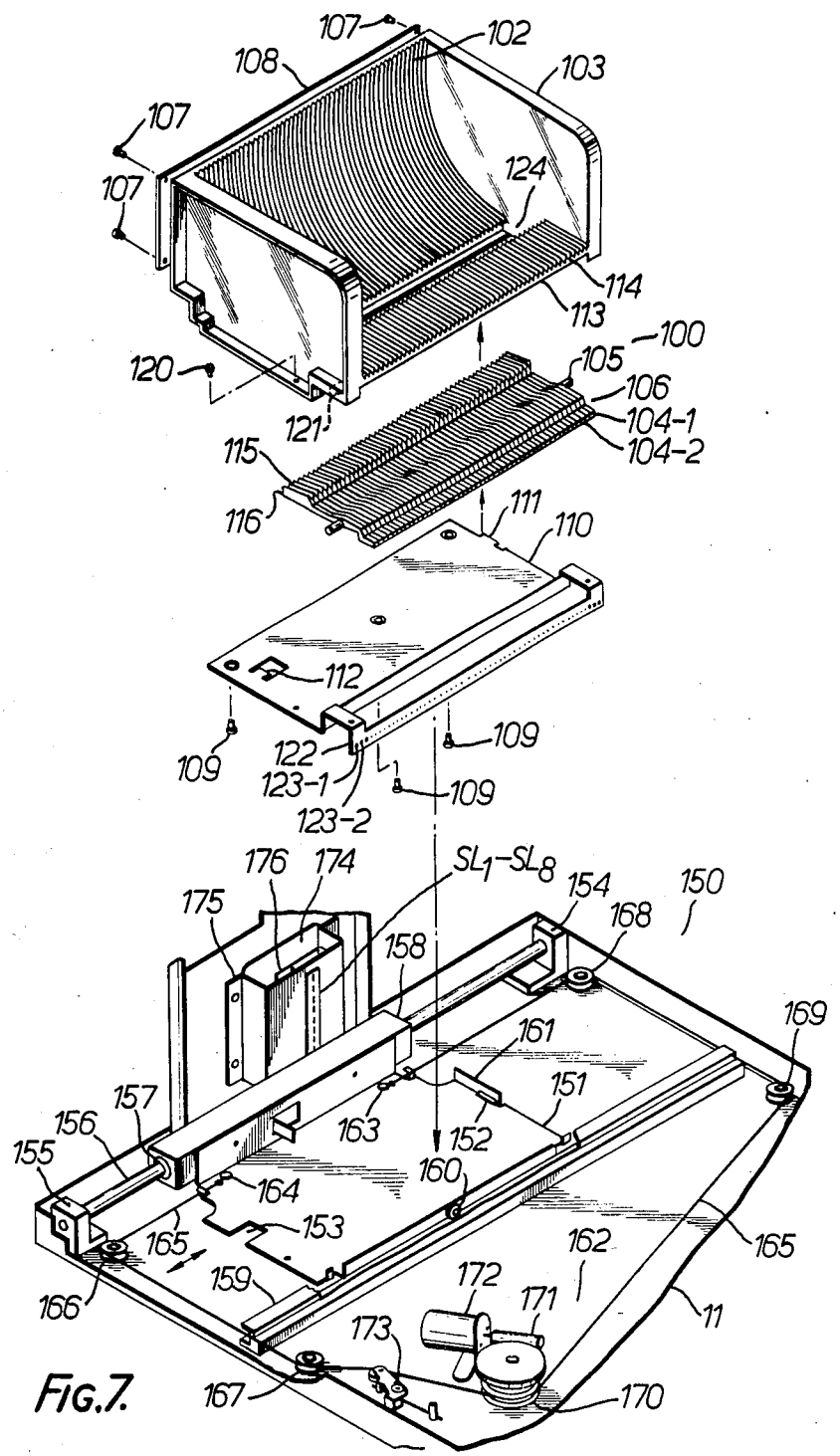

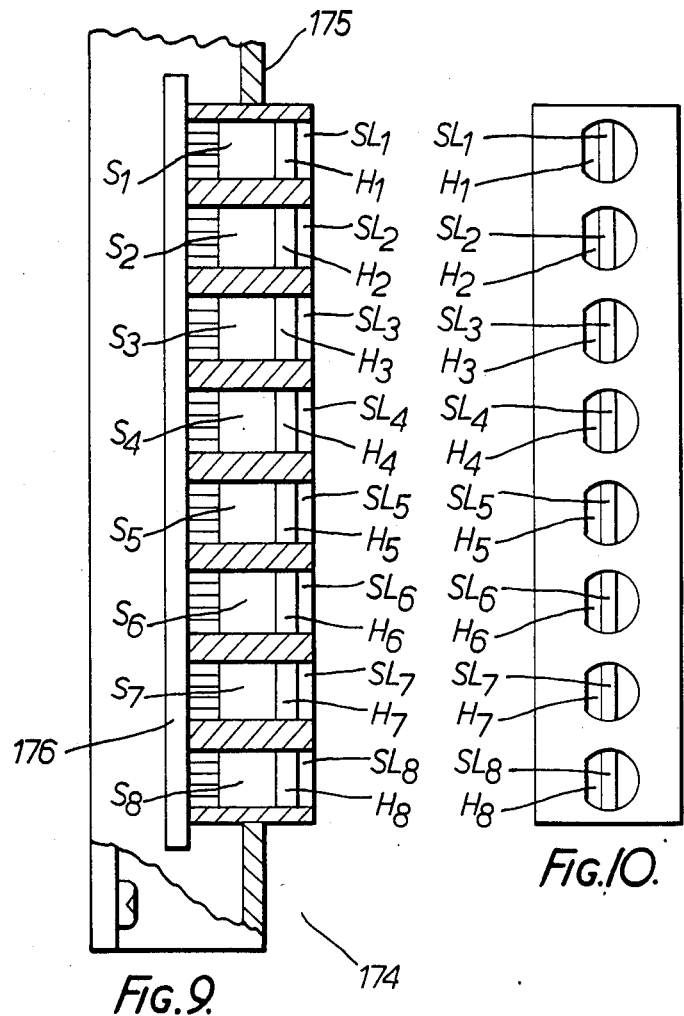

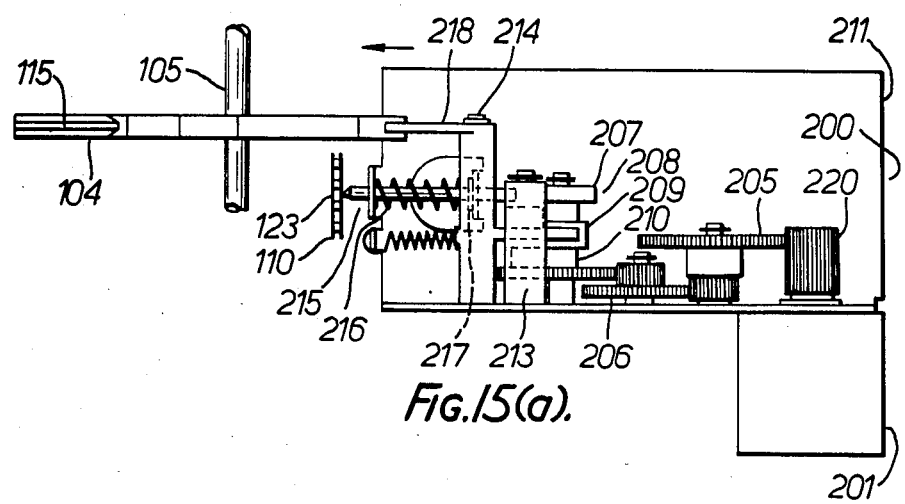
Fig.15(a).
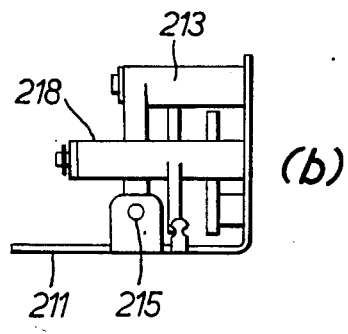
(b)

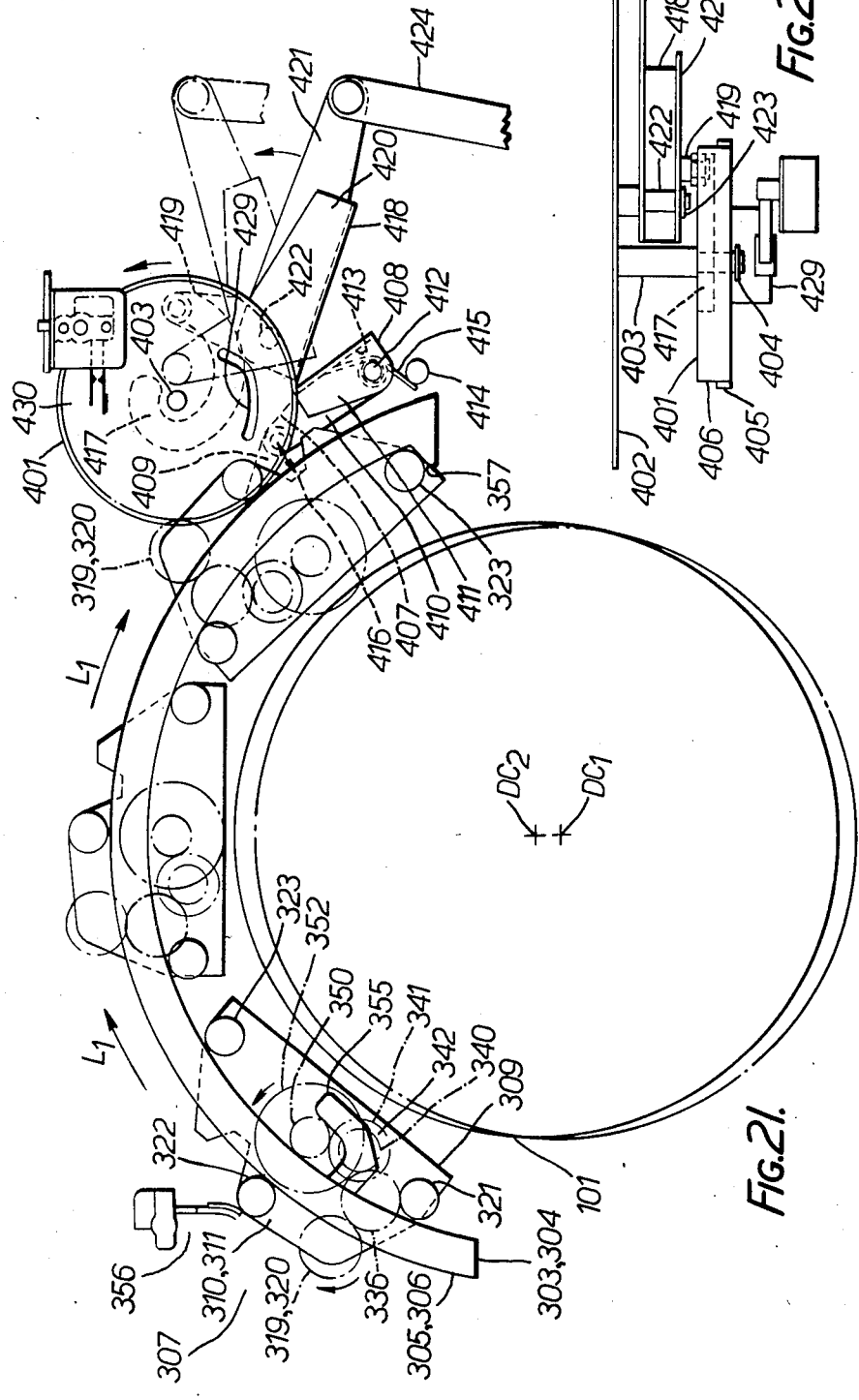
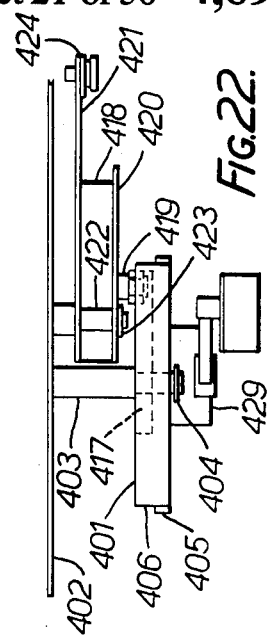
Fig.21.
Fig.22.

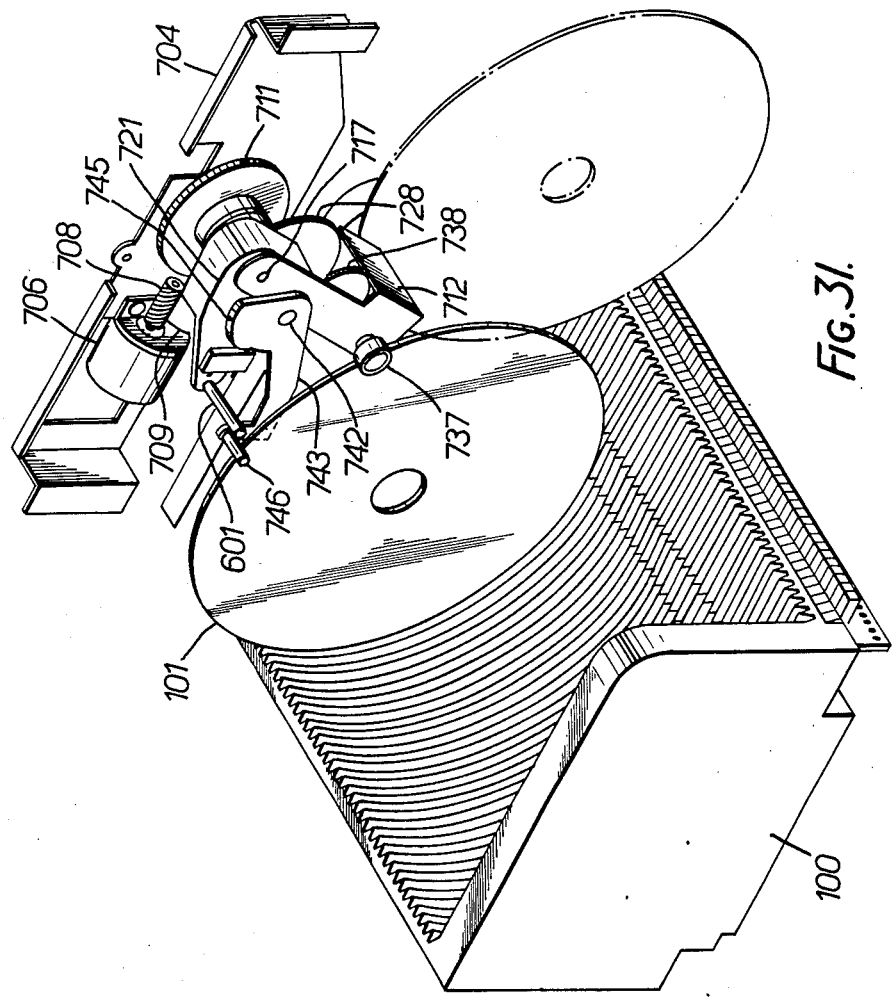

AUTOCHANGER TYPE DISC PLAYER

This is a division of application Ser. No. 618,937, filed June 8, 1984, now U.S. Pat. No. 4,601,026.

BACKGROUND OF THE INVENTION

The present invention relates to an autochanger type disc player suited to optical compact discs, for example.

Recently, in the field of audio equipment, digital audio disc playback systems utilizing pulse code modulation technology to play back sound as faithfully as possible have seen developed. Of these systems, playback systems employing optical compact discs have been especially popular.

Specifically, an optical disc used in the playback system consists of a disc which is made from a transparent resin and has a diameter of 12 cm and a thickness of 1.2 mm. The disc has a thin metal film deposited on at least one surface thereof, and pits or depressions are formed in the thin metal film, corresponding to digitized (pulse code-modulated) data so that logic 1 and 0 may produce different light reflectivities. When a signal is read out from the compact disc, the disc is rotated at a variable rotation frequency of 200 to 500 rpm with a constant linear velocity while an optical pickup incorporating a semiconductor laser or photoelectric transducing device tracks the information storage area of the disc rectilinearly from the inner side toward the outer side.

The compact disc stores such a large quantity of information that it permits a stereophonic playback for about one hour even if only one side of the disc is used for information storage. It has been theoretically proved that the optical disc is much superior to the conventional analog phonograph record in both playback characteristics and recording density.

In view of the excellent characteristics of the optical compact disc, it has been suggested to use optical discs in an automatic multi-disc playback system for business use. In particular, this corresponds to a jukebox or an orchestra accompaniment playback apparatus (that is known as "karaoke" apparatus in Japan) which is put into practical use with analog phonograph records. It is possible to realize the automatic multi-disc playback system by means of an autochanger type disc player. Known autochanger type disc players of this kind are complex in structure and bulky, however, partially because they have been designed for use with analog phonograph records. Therefore, the conventional disc players present control problems. Further, the requirement of more certain operation limits the number of discs held within such a disc player. Another problem is the long time it takes to exchange one disc for another.

For these reasons, if the conventional autochanger type disc player is applied to optical compact discs without changing the essential structure of the disc player, there arise numerous problems. Hence, the development of an autochanger type disc player suited for optical compact discs is a matter of urgency.

The same circumstances apply to video disc players and optical disc document file systems which are soon to be put into practical use.

Summary of the Invention

In the view of the foregoing, it is an object of the present invention to provide an autochanger type disc player which is capable of selectively playing a disc stored therein or another disc from outside thereof, is simple in structure, and is able to operate with certainty.

Another object of the present invention is to provide an autochanger type disc player which has a mechanism for transferring a disc between a disc storage section in a housing of the disc player and outside thereof.

According to one aspect of the present invention, the autochanger type disc player is adapted to automatically select a desired disc from a disc storage section or a tray holding a number of discs therein or a disc subjected to playback from outside of the disc player and to supply it to a disc playback section in such a way that the selected disc is able to be played, and which comprises: a housing having a disc take-in/take-out portion including a port through which a predetermined disc is taken into or taken out of the housing from or to outside thereof, a disc storage section defined in the housing, the storage section being capable of holding a plurality of discs therein, a disc playback section capable of playing a disc and capable of taking a first position and a second position, the playback section including an opening through which a disc is loaded therein or unloaded therefrom, a first disc transferring passage for transferring a disc between the disc storage section and the disc playback section, one end thereof being faced to the opening when the disc playback section takes the first position, a second disc transferring passage for transferring a disc between the disc take-in/take-out portion and the disc playback section, one end thereof being faced to the opening when the disc playback section takes the second position, and means for controlling the disc playback section between the first and second positions.

Additional objects, advantages, and features of the present invention will become apparent to persons skilled in the art from a study of the following description and of the accompanying drawings, in which:

BRIEF DESCRIPTION OF THE DRAWINGS

FIG. 7 is an exploded perspective view specifically showing the tray and the tray drive mechanism shown in FIG. 1;

FIG. 9 is a cross-sectional view specifically showing the photosensing portion shown in FIG. 7;

FIG. 10 is a view showing the slit shape of the holder shown in FIG. 9;

FIGS. 15(a)-15(f), 16(a)-16(f), and 17 are views specifically showing the details of the disc selection mechanism of FIG. 1 and for showing the operation conditions;

FIG. 21 is a view for illustrating the operations of the first and second loading mechanisms;

FIG. 22 is a top view showing the main portions of the second loading mechanism;

FIG. 31 is a view for illustrating the operation of the disc temporary standby mechanism and the unloading mechanism.

DESCRIPTION OF THE PREFERRED EMBODIMENT

Figure 1:
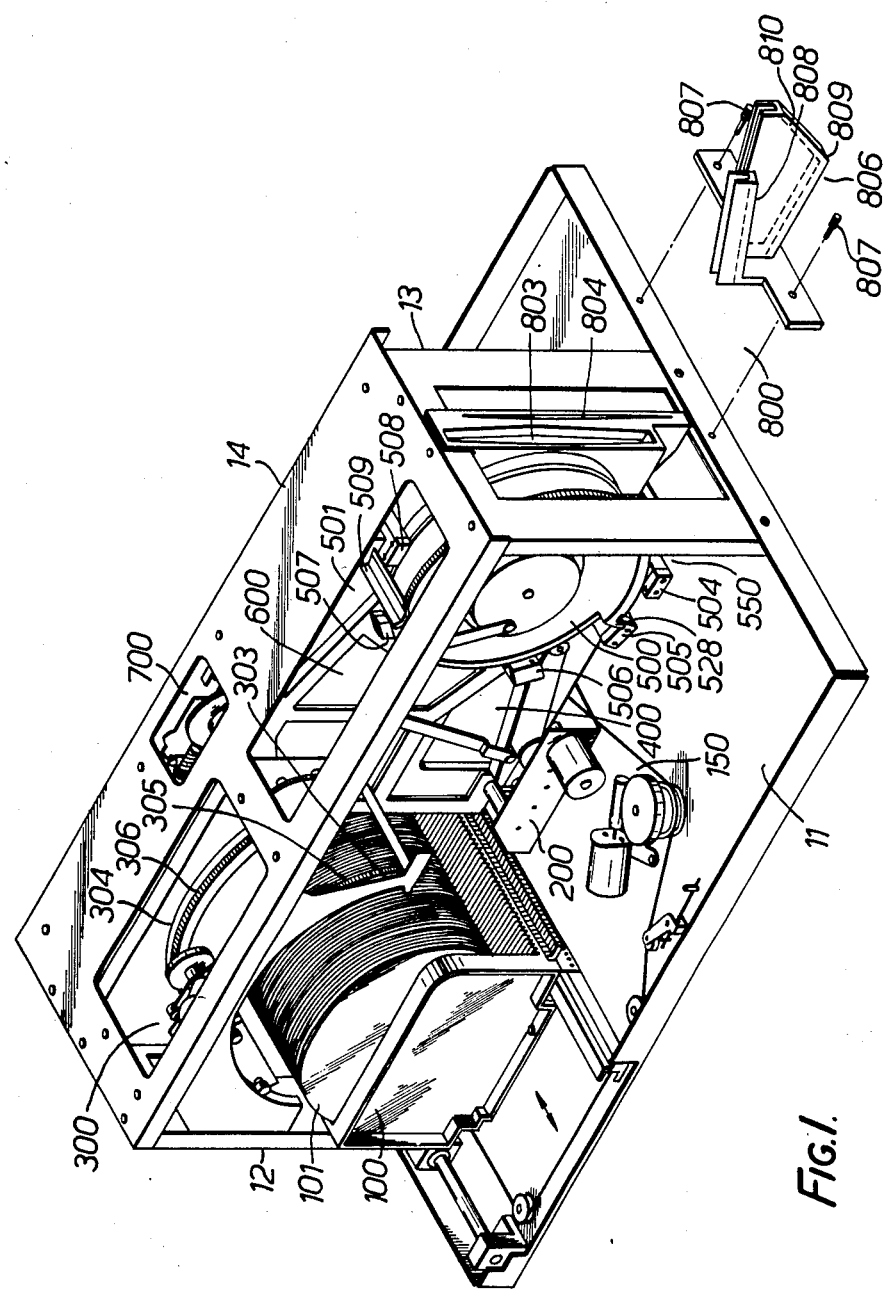
FIG. 1 is a perspective view of an autochanger type disc player according to the present invention.

The present invention will now be described in detail with reference to the accompanying drawings: FIG. 1 to FIG. 31. Throughout the drawings like reference numerals and letters are used to designate like or equivalent elements for the sake of simplicity of explanation.

Figure 2:
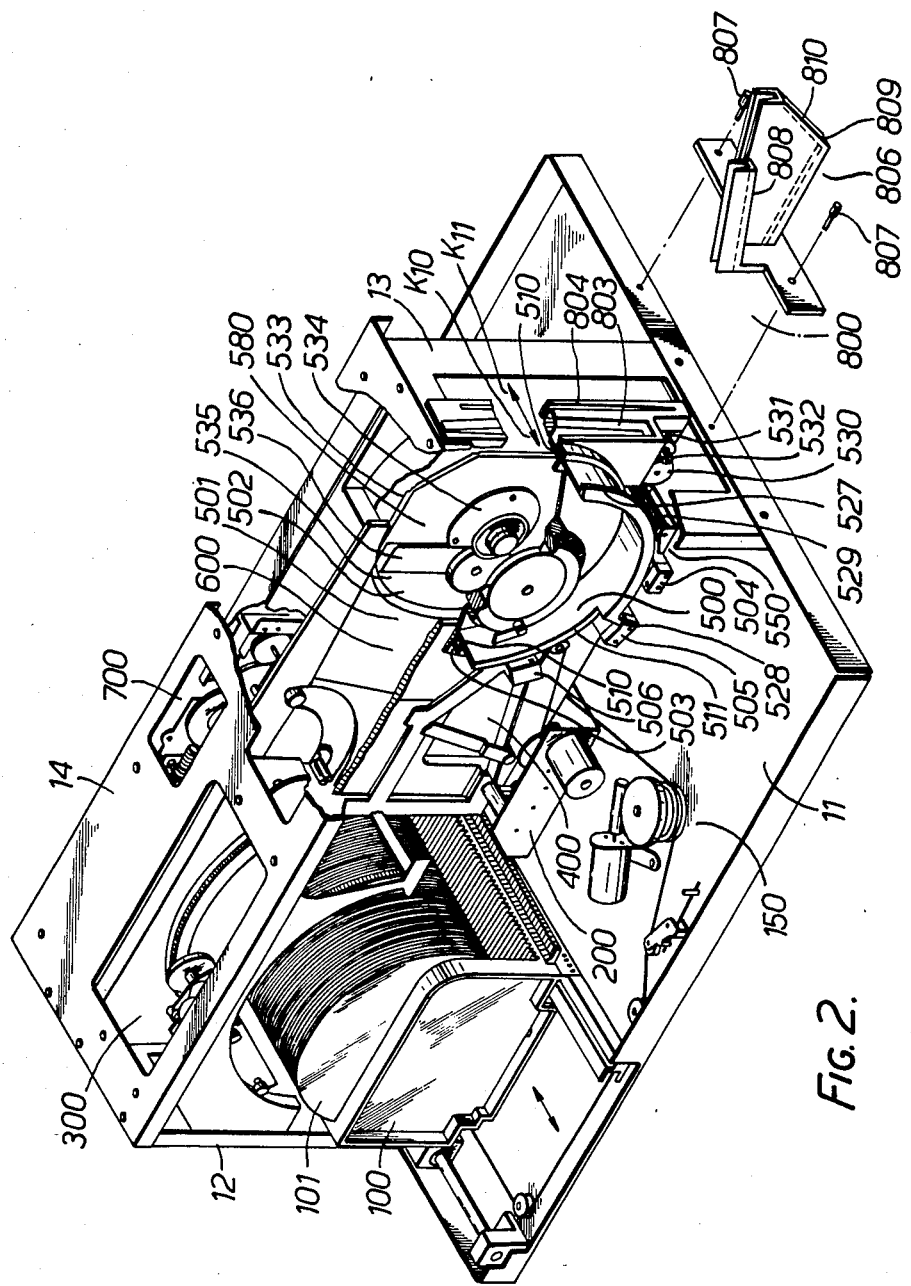
FIG. 2 is a partially cutaway perspective view of the autochanger type disc player shown in FIG. 1.
Figure 3:
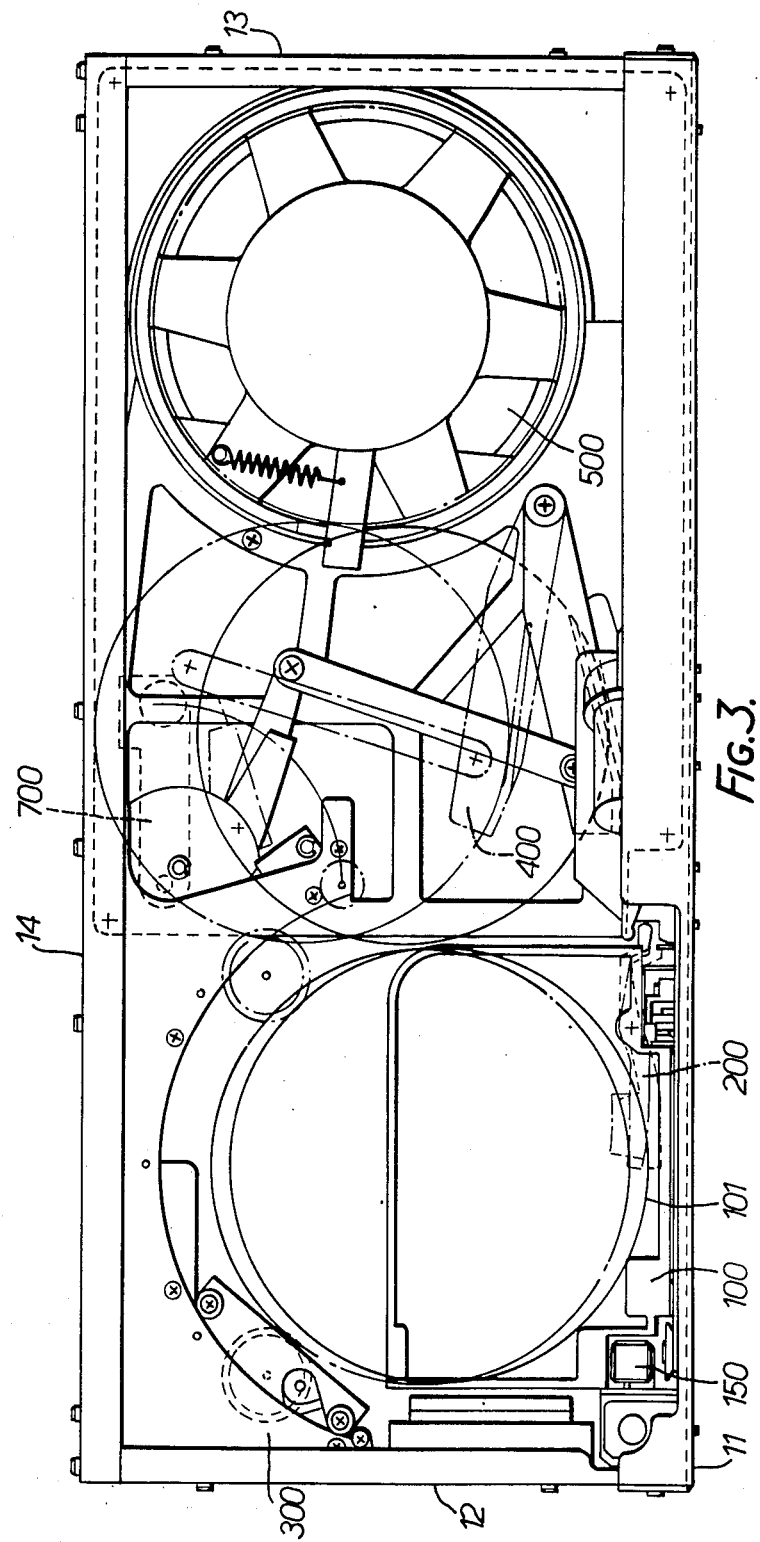
FIG. 3 is a front elevation of the autochanger type disc player shown in FIG. 1.
Figure 4:
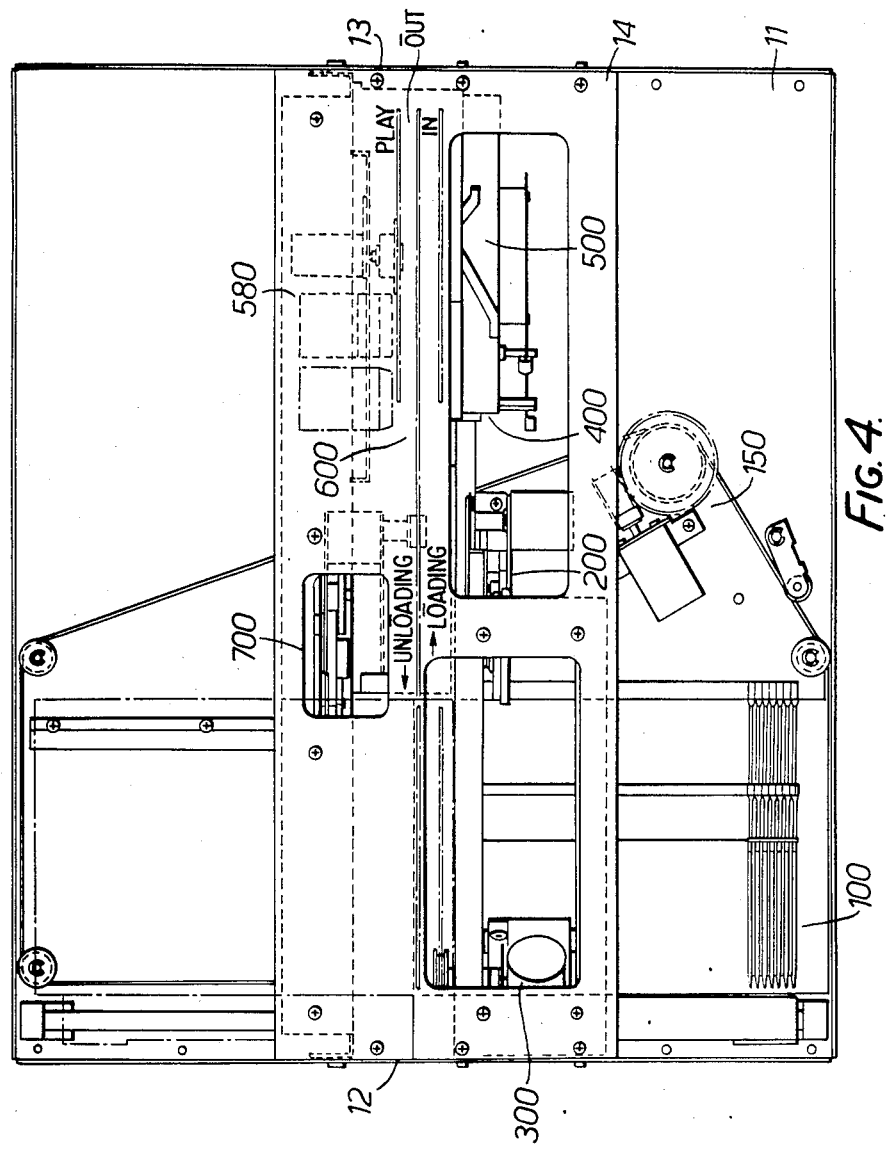
FIG. 4 is a plan view of the autochanger type disc player shown in FIG. 1
Figure 5:
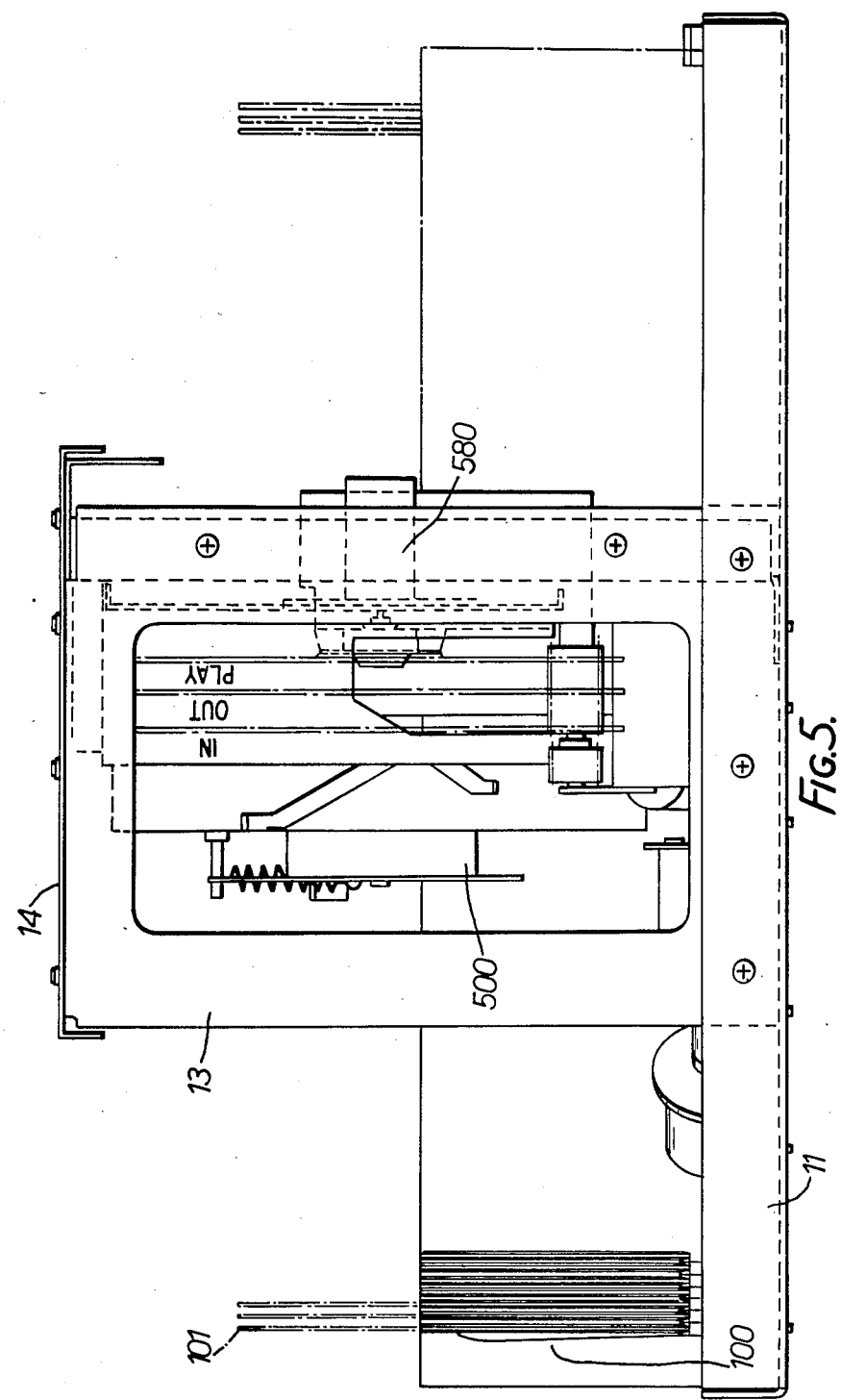
FIG. 5 is a left side elevation of the autochanger type disc player shown in FIG. 1

Referring now to FIGS. 1 and 2, there is shown an autochanger type disc player with the housing removed. This disc player includes a main chassis 11, a left side plate 12, a right side plate 13, and a top plate 14. Mounted among these members in the manner described later are a disc storage section e.g., a tray 110, a tray drive mechanism 150, a disc selection mechanism 200, a first loading mechanism 300, a second loading mechanism 400, a disc pocket mechanism 500, a disc playback mechanism 580, a disc temporary standby mechanism 600, and an unloading mechanism 700.

Before describing these components individually, their fundamental structures and functions will be described by referring to FIGS. 3, 4, 5 and 6 which are a front elevation, a plan view, a left side elevation, and a schematic representation, respectively, of the disc player shown in FIG. 1.

(1) The tray 100, in which a given number of discs 101 are normally held upright in the recessed positions and juxtaposed, is driven in the direction indicated by the arrows shown so that desired discs may assume a predetermined position by the tray drive mechanism 150 according to disc selection and access information.

(2) The tray 100 is accurately positioned by the disc selection mechanism 200. One disc 101 in the tray 100 can be raised at a time by about 5 mm to a recessed position from the position in which the disc 101 is generally held.

(3) A first disc 101 selected by the first loading mechanism 300 is moved from the tray 100 into a loading passage, from which the disc 101 is brought into a take-in position (IN) within the disc pocket mechanism 500 by the second loading mechanism 400.

(4) The disc pocket mechanism 500 is rotated forward by the pocket control mechanism 550 so that the first disc 101 may be brought to a playback position (PLAY). Then, the disc 101 is played by the action of the disc playback mechanism 580.

(5) The disc pocket mechanism 500 is rotated backward by the disc pocket control mechanism 550 so that the first disc 101 may come to a take-out position (OUT). Thereafter, the first disc 101 is transferred to a position within the disc temporary standby mechanism 600 from which the first disc 101 may able be unloaded.

(6) A second disc 101 to be played is taken out of the tray 100 and moved into the disc pocket mechanism 500, according to the information about access to the disc, in the same manner as the aforementioned procedure (4) above.

(7) While the second disc 101 is subjected to the playback operation in step (6), the first disc 101 having been played is moved to a given position within the tray 100 by the unloading mechanism 700 before the second disc 101 is conveyed into the temporary standby mechanism 600 in the step (5).

(8) The step (5) and the following steps are repeated.

To permit the disc 101 that has been played to be taken out or a foreign disc to be introduced from outside the disc player during the execution of these steps when the need arises, a disc take-in/take-out mechanism 800 is provided.

Figure 6:
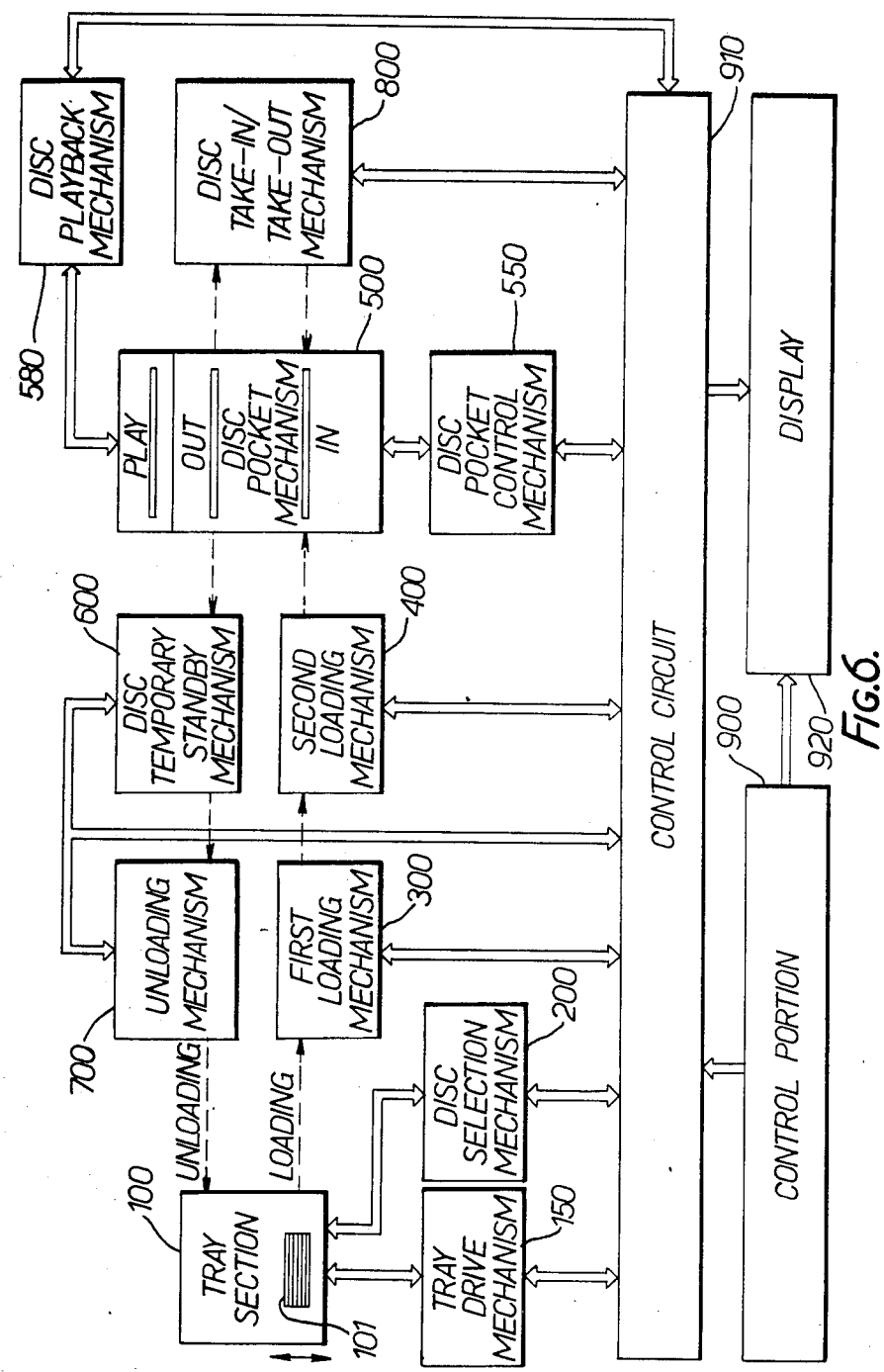
FIG. 6 is a schematic representation of the operation of the autochanger type disc player shown in FIG. 1

Referring next to FIG. 6, there is shown a control portion 900 which produces various operation command signals including the signal about accessing disc. These signals are fed to a control circuit 910 that controls the aforementioned components in timed sequence according to these input signals. The performance of some of these operations is visibly indicated by a display portion 920.

The autochanger type disc player constructed as described is able to hold a large number of discs in a minimum amount of space, is able to exchange the disc having been just played for another at a high speed, and is capable of operating with certainty because of the structural components and functions described above. Each individual compoment will now be described in greater detail.

Referring to FIG. 7, the tray 100 and the tray drive mechanism 150 described previously are shown in exploded perspective view. The tray 100 has a tray body 103, a push-up lever mechanism 106 shaped like a piano keyboard and disposed at the lower portion of the front fringe of the body 103, a light reflecting plate 108 used for access purposes, and a locator member 110. The tray body 103 is provided with a number of grooves 102 for receiving discs, the grooves extending through an arc of about 90°. The lever mechanism 106 is comprised of lever 104-1, 104-2, etc. which are held to a support 121 by a common shaft 105 in such a way that these levers are rockable independently of one another, as described later. The light reflecting plate 108 is mounted to the back side of the body 103 with screws 107. The locator member 110 is mounted in the lower portion of the body 103 with screws 109 such that the lever mechanism 106 is held by the locator member 110.

The locator member 110 is formed with a pair of protrusions 111 and 112 at opposite ends in its recesses. The tray drive mechanism 150 has a carrier 151 (described later) which is provided with a pair of recesses 152 and 153, with which the protrusions 111 and 112 engage. Thus, the tray 100 is able to be accurately located relative to the tray drive mechanism 150 and is able to be detachably mounted to the mechanism 150. Usually, the locator member 110 is securely fixed by screws 120 to the carrier 151 at the front end of the tray body 103 to prevent the tray 100 from coming loose or off unexpectedly. The locator member 110 has in the lower portion of its side fringe a skirt 122 which is provided with a plurality of guide holes 123-1, 123-2, and so on, formed with the same pitch as that of the grooves 102 in the tray body 103 for locating purposes.

The tray drive mechanism 150 has a guide shaft 156, a bearing holder 158, a guide rail 159 shaped like the letter "U" when viewed from the front, a tray carrier portion 161, and a carrier driver 162 for driving the carrier portion 161. The guide shaft 156 is supported at a position near the left end of the main chassis 11 by a pair of holders 154 and 155. The bearing holder 158 is supported by the guide shaft 156 via a linear bearing 157 so that the holder 158 may make a sliding movement relative to the shaft 156 in either direction as indicted by the arrows. The guide rail 159 is opposite to the guide shaft 156 and is held to the main chassis 11 in a manner to leave, a gap therebetween. The tray carrier portion 161 consists of the aforementioned carrier 151 and a similar carrier, one of which is directly mounted between the guide rail 159 and the bearing holder 158, the other being slidable via a roller 160 in the directions indicated by the arrows.

The carrier driver 162 includes a wire 165 made of stainless steel, four guide pulleys 166, 167, 168, and 169 supporting the wire 165 in such a manner that the wire 165 is able to slide in the directions indicated by the arrows while describing a loop. A pulley gear 170 around which several turns of the wire 165 are wound, a worm gear 171 meshing with the pulley gear 170, an electric motor 172 for driving the worm gear 171, and a tension arm mechanism 173 for applying certain tension to the wire 165 cooperate to move the carrier 151. The wire 165 is mounted at both ends to the carrier 151 via fixtures 163 and 164.

As also shown in FIG. 7, a photosensing portion 174 which senses reflected light for accessing discs (as described later) is mounted on the inner side of the side plate 12 via a mounting board 175.

Figure 8A:
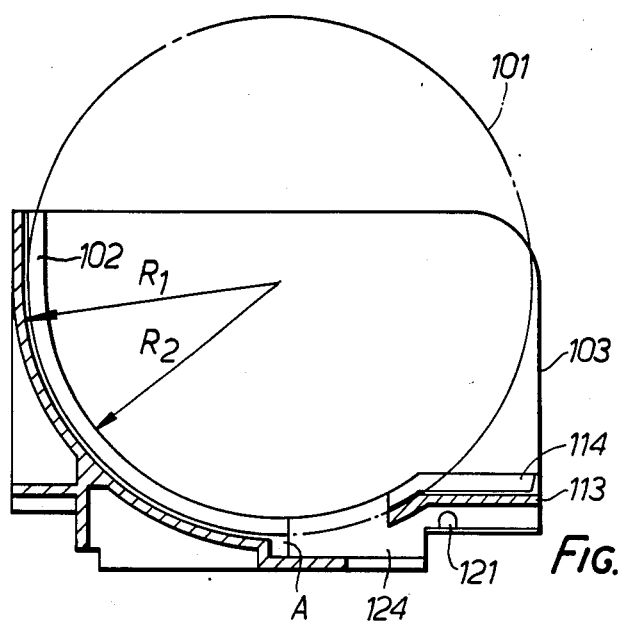
FIGS. 8(*a*), 8(*b*), and 8(*c*) are views specifically showing the tray body shown in FIG. 7.
Figure 8B:
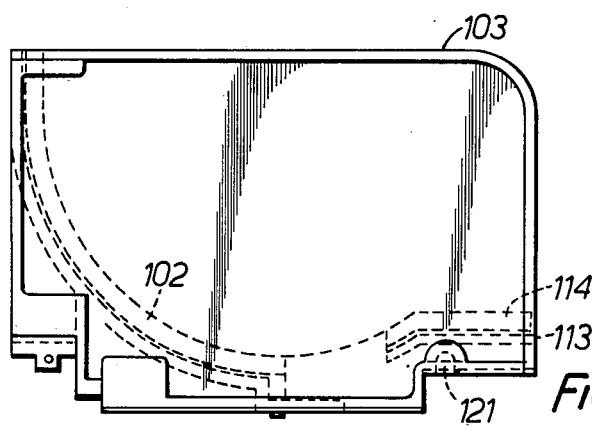
Figure 8C:
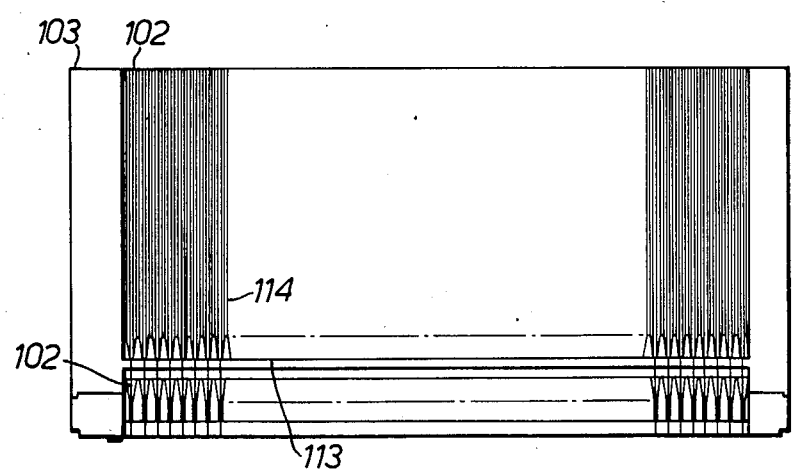
Figure 11:
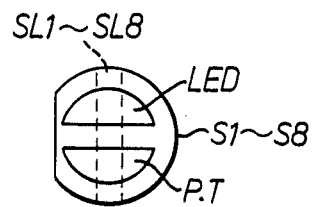
FIG. 11 is a view illustrating the relation of the sensors to the slits of FIG. 9.

FIGS. 8(a), (b), and (c) are a front elevation in section, a front elevation, and a left side elevation, respectively, of the tray body 103 thus described. As noted above, the body 103 is provided with a number of grooves 102, fifty in the example shown, each of which extends through an angle of 90° in the recesses. The grooves are successively formed with a certain pitch. Each of the grooves has a radius of curvature $R_1$ so as to accommodate the received discs 101, and these grooves are separated by ridges having a radius of curvature $R_2$ smaller than $R_1$. In the example shown, in order to accomodate the optical compact disc having a thickness of 1.2 mm, the pitch is 3 mm, the width of the grooves is 1.3 mm, and the width of the ridges is 2.2 mm and widen backwards. Also formed in the plane of radii of curvatures $R_1$ and $R_2$ are guide grooves 114 which are slightly raised from each bottom (A) of the grooves 102 to form a front fringe 113. The guide grooves 114 are similar in shape and parallel to the grooves 102. The regions between the neighboring disc holding grooves 102 and the guide grooves 114 formed in the tray body 103 are cut out at 124. The front ends of the levers 104-1, 104-2, and so on of the push-up lever mechanism 106 are inserted into these cutouts 124.

As shown in FIG. 7, the front ends of the levers 104-1, 104-2, and so on are provided with push-up grooves 115 whose bottoms have a radius of curvature $R_1$, corresponding to the grooves 102. The grooves 115 are separated by ridges having a $S_1$ to $S_8$ and the light-receiving portions P.T. Each of the light-emitting portions LED and the light-receiving portions P.T. may take a substantially semiconductor configuration.

Figure 12:
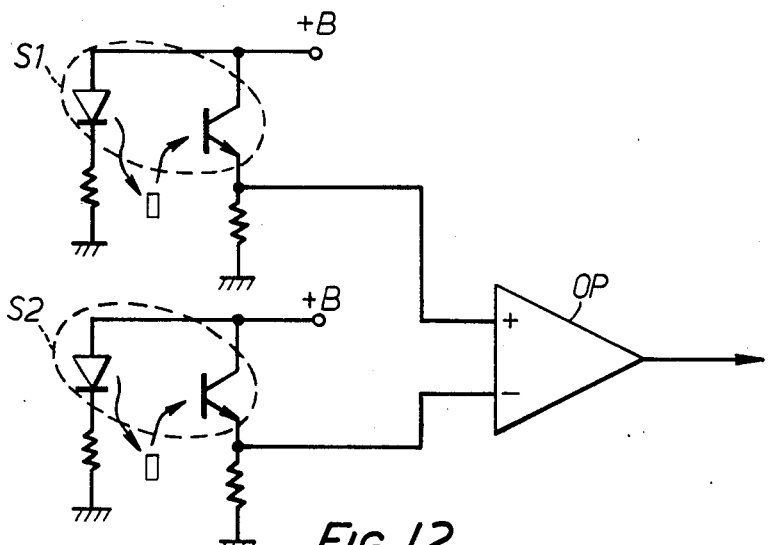
FIG. 12 is a diagram showing the electrical connections of the sensors of FIG. 9.

Referring next to FIG. 12, the outputs of the upper two sensors $S_1$ and $S_2$ are connected into a differential configuration for locating purposes. In particular, the output from the sensors $S_1$ and $S_2$ are applied to the non-inverted phase input terminal (+) and the inverse phase input terminal (−), respectively, of an operational amplifier OP. The motor 172 in the tray driver 162 is controlled by an output signal produced from the amplifier OP. The other sensors $S_3$ to $S_8$ are used to read out addresses.

Figure 13:
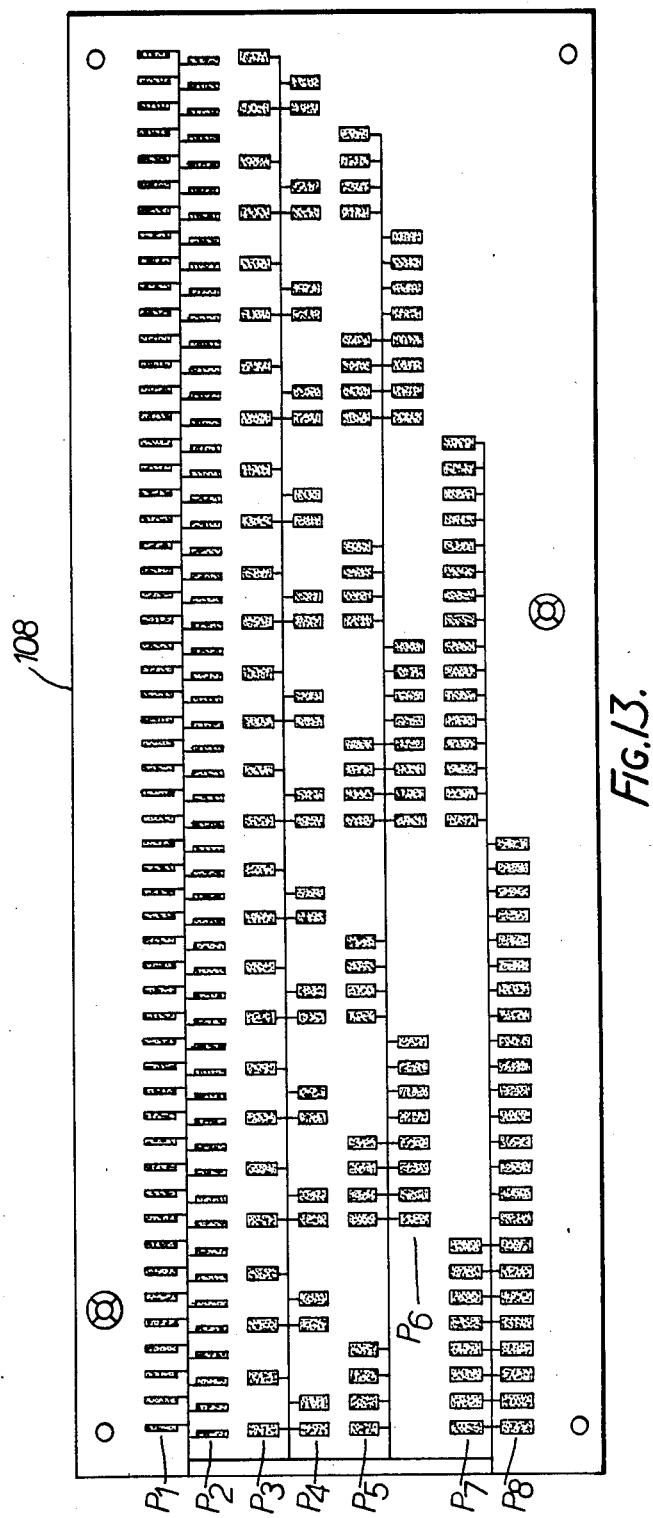
FIG. 13 is a view specifically showing the reflecting plate of the sensors of FIG. 7.

FIG. 13 specifically shows the light reflecting plate 108 used in controling and accomplishing disc access. The upper two reflective patterns $P_1$ and $P_2$ are used for locating purposes. The elements of both patterns $P_1$ and $P_2$ overlap each other by 0.25 mm, corresponding to the disc holding grooves 102 in the tray body 103. The number of the elements in each pattern is fifty. The other reflecting patterns $P_3$ to $P_8$ represent addresses 1 to 50 corresponding to the disc holding grooves 102 in the body 103 in binary notation.

The aforementioned photosensing portion 174 reads reflective patterns $P_3$ to $P_8$ which give addresses 1 to 50 to the sensors $S_3$ to $S_8$ via the light reflecting plate 108 installed on the back of the tray body 103, and the photosensing portion 174 causes the tray drive mechanism 150 to move the tray 100 to a predetermined access position. Then, the photosensing portion 174 is capable of accurately locating the tray 100 within an error of 0.25 (±0.125) mm by the use of the sensors $S_1$ and $S_2$.

Figure 14:
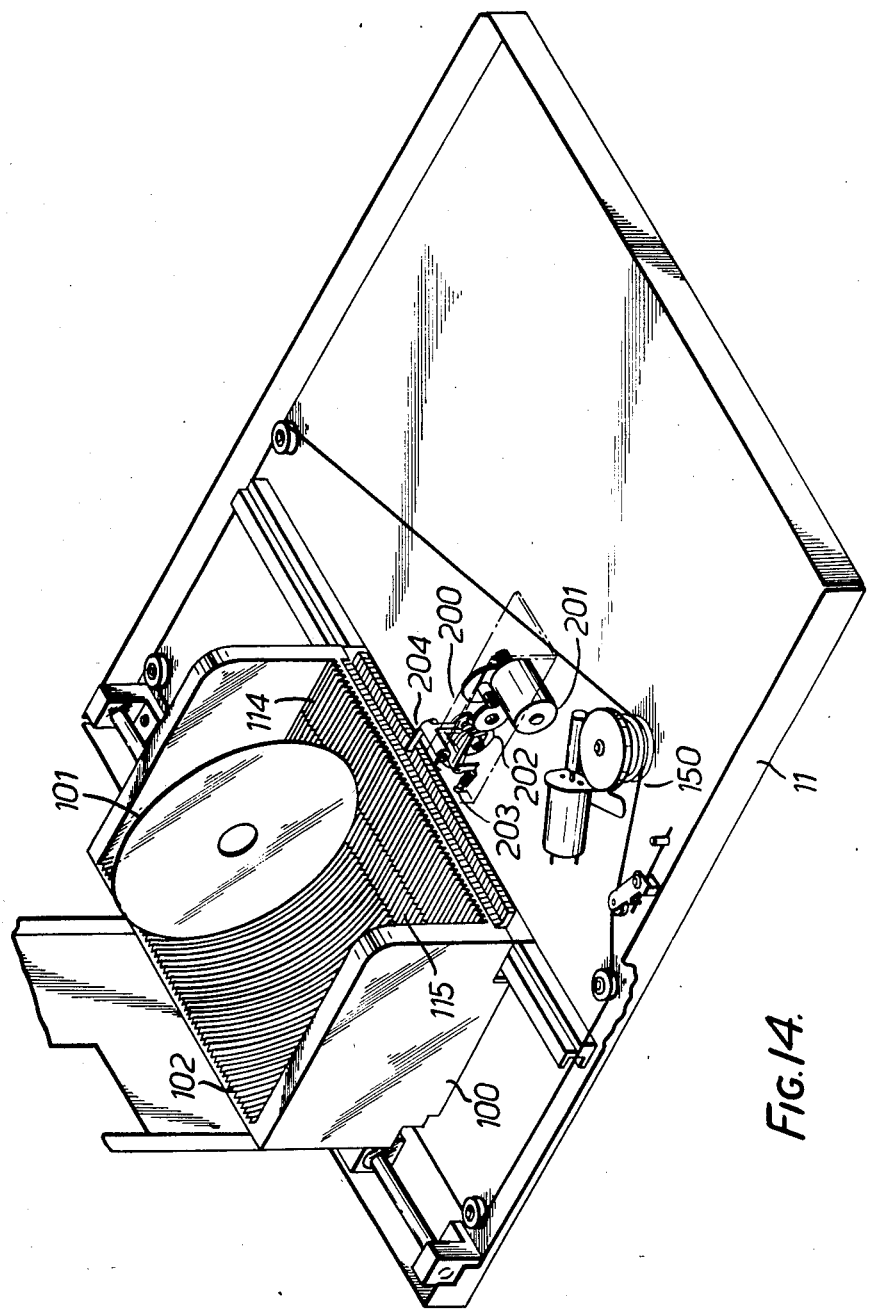
FIG. 14 is a perspective view showing the condition subsequent to the assembly shown in FIG. 7.

FIG. 14 shows the manner in which the tray 100 is incorporated in the tray drive mechanism 150, together with the disc selection mechanism 200. For simplicity, only one of the discs 101 disposed in position to be fetched (position at which the sensors $S_1$ to $S_8$ are disposed) is shown in the tray 100.

The disc selection mechanism 200 includes the motor 201, a locator shaft 203 that is driven by the motor 201 via a transmission mechanism 202 (described later), and a disc push-up lever 204. The motor 201 is started after the tray 100 has been brought into the given access position by the tray drive mechanism 150, as described above.

Figure 15C:
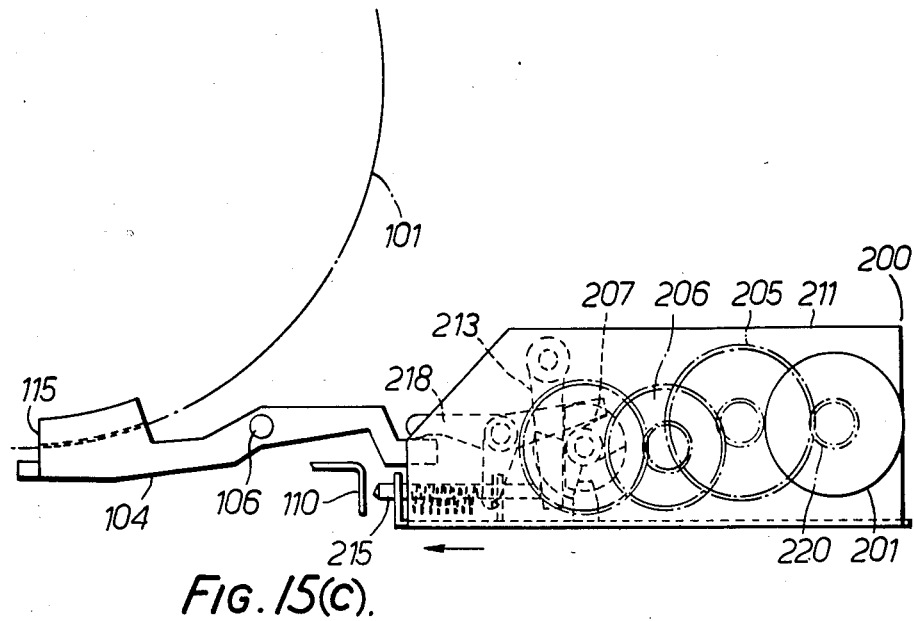
Figure 15D:
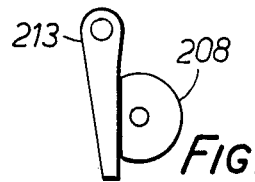
Figure 15E:
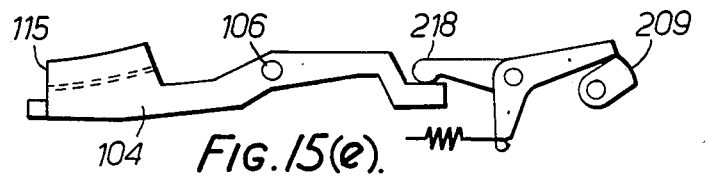
Figure 15F:

Referring next to FIGS. 15(a), 15(b), and 15(c), the disc selection mechanism 200 is shown specifically. A pinion gear 220 is fixedly secured to the output shaft of the motor 201. When the motor 201 is driven, the gear 220 is rotated in a counterclockwise direction as viewed in the figures. The rotary motion in the clockwise direction is transmitted to a cam gear 207 via reducer gears 205 and 206 which together constitute the aforementioned transmission mechanism 202. The cam gear 207 has three cam portions 208, 209, 210 which are shown in FIG. 15(d), 15(e), 15(f), respectively. Of these three cam portions, the third cam portion 210 bears on a bent portion 212 which is formed on the mounting board 211 of the disc selection mechanism 200, to limit the angular displacement of the cam gear 207 for preventing the cam gear 207 from rotating in a counterclockwise direction.

Clockwise rotation of the cam gear 207 causes the first cam portion 208 to rock a shaft push lever 213 about pivot 214, so that the front end of the lever 213 pushes the rear end of a locating shaft 215, which is urged toward the shaft push lever 213 by a spring 216 and a retaining ring 217 disposed on the locating shaft 215. Then, the first cam portion 208 turns the shaft push lever 213, pushing the locating shaft 215 in the direction indicated by the arrow. This causes the tapering front end of the shaft 215 to enter the corresponding guide hole 123 formed in the locating member 110 in the tray 100. Thus, it is possible to make the error of ±0.125 mm of the access position of the tray 100 obtained by the photosensing portion 174 less than the clearance fit of 0.01 to 0.03 mm with which the locating shaft 215 is mounted in the guide hole 123. It is possible to correct the position of the tray 100 by pushing the locating shaft 215 with a sufficient force to overcome the frictional force in the tray drive mechanism 150.

When the cam gear 207 is rotated further, the second cam portion 209 pushes the lever 218 to rock it in a counterclockwise direction. The disc selection mechanism 200 is so disposed that the front end of the lever 218 is able to engage with the base of the levers 104 of the push-up lever mechanism 106 incorporated in the tray 100.

Figure 16A:
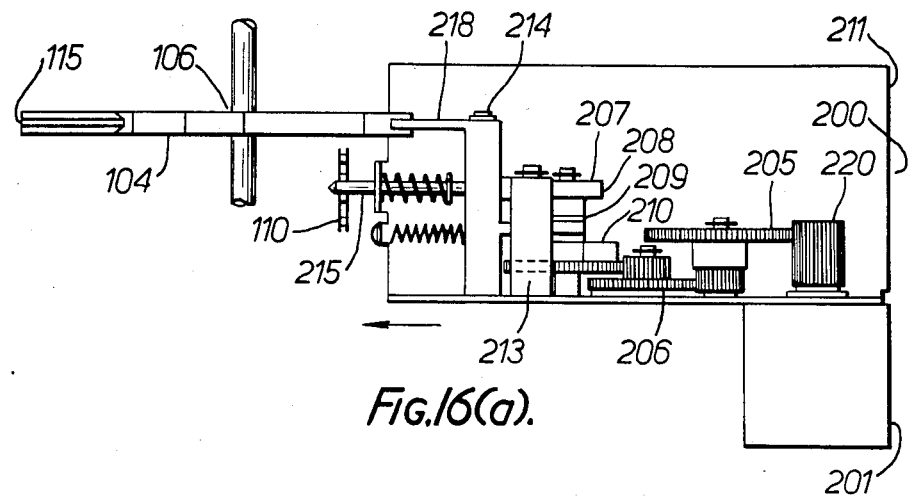
Figure 16B:
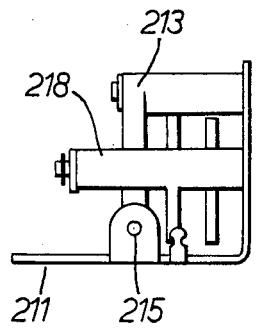
Figure 16C:
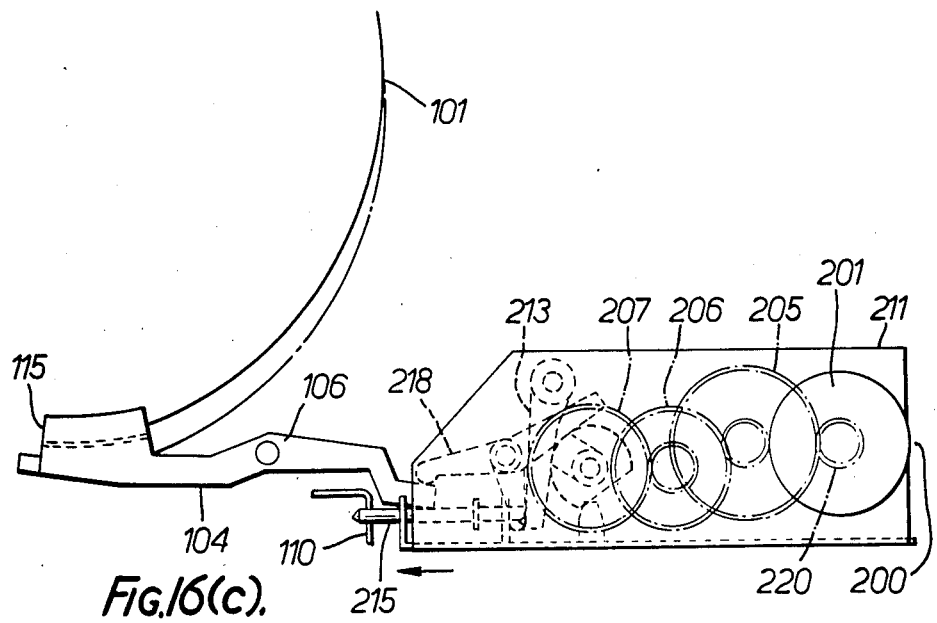
Figure 16D:
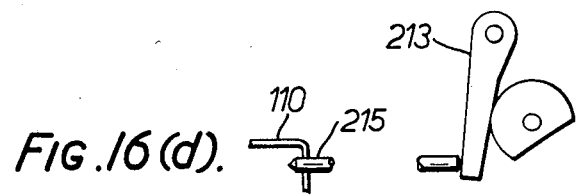
Figure 16E:
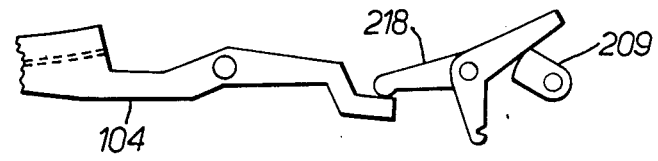
Figure 16F:
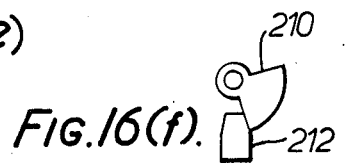
Figure 17:
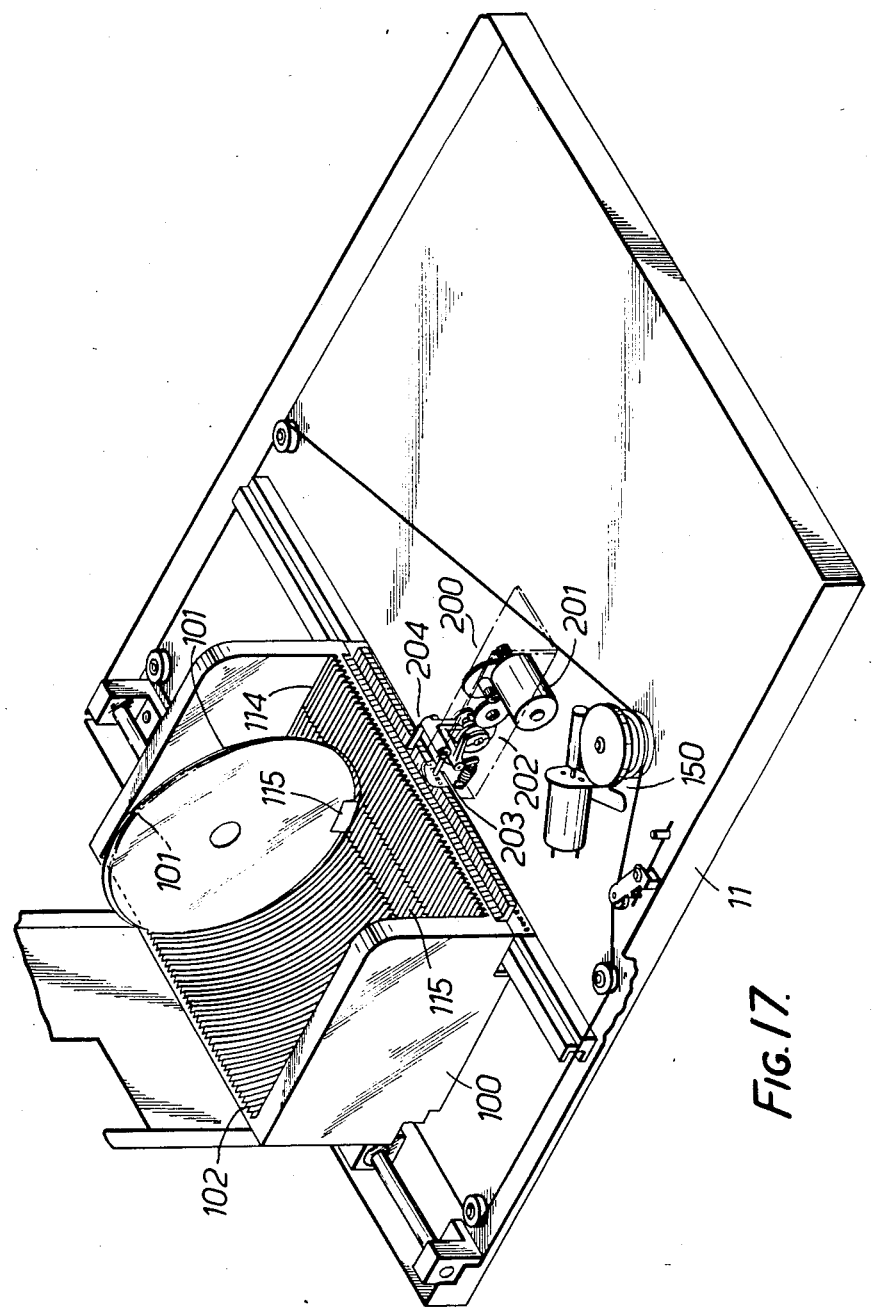

In this way, the lever 218 rocks the lever 104, which is in the given access position as shown in FIGS. 16(a) to 16(e) and FIG. 17, clockwise as viewed in the figures, and therefore only the desired disc received in the push-up groove 115 in the lever 104 is raised by about 5 mm from the position indicated by the dot-and-dash line to the position indicated by the solid line. Thus, it is possible to select and retrieve the desired disc. The actual selection operation is completed when the cam gear 207 rotates further, causing the third cam portion 210 to bear on the bent portion 212 as shown in FIG. 16(e). The disc selection mechanism 200 constructed as thus far described combines the function of selecting disc with the function of locking the tray 100.

If the motor 201 is driven in a clockwise direction after these operations, the reverse processes are effected, and the system is restored to the original condition. The features of the tray 100, the tray drive mechanism 150, and the disc selection mechanism 200 are next described.

With respect to the tray 100, the body 103 is characterized in that the grooves 102 for holding each disc 101 at about a quarter of each periphery are formed and that the guide grooves 114 for loading and unloading the discs 101 are formed at positions higher than each bottom of the grooves 102. This structure makes the discs 101 held in the tray 100 stationary unless an external force is applied and hence this structure prevents vibration or the like from shifting the discs from the proper positions. Consequently, it is assured that any desired disc 101 is able to be retrieved and loaded with certainty.

Another feature is that the tray 100 incorporates the disc push-up mechanism 106 which is provided with grooves 115 corresponding to grooves 102 holding the discs so as to be able to push up desired discs 101 separately. This permits the tray 100 to hold many discs 101 in the maximum capacity possible and to load the desired disc 101 with certainty.

A further feature is that the tray 101 has guide holes 123 which are formed with the same pitch as the grooves 102 holding the discs 101 so as to be used as the reference of the final locating operation for access to the desired disc 101. This allows an increase in the precision with which access to the disc is made by the tray drive mechanism 150 using an electrical signal. The final locating operation of the tray 100 means that the tray 100 is more accurately located by overcoming the friction caused by the tray drive mechanism 150, after the mechanism 150 effects the locating operation according to the electrical signal from the photosensing portion 174 as mentioned above. More specifically, this operation is achieved by pressing the tapering front end of the locating shaft 215 into the guide hole 123 in the locating member 110 to correct the position of the tray 100.

Still another feature is that the tray 100 is so constructed that the accuracy with which the tray 100 is mounted in the tray drive mechanism 150 is always ensured. This feature arises from the fact that the disc 101 is able to be installed and replaced by others under the condition that the tray 100 is detached from the body of the apparatus. As the number of discs 101 held increases, this feature become more significant.

Yet another feature relates to the photosensing portion 174 in the tray drive mechanism 150 for access to the desired disc and arises from the structure in which the slits $SL_1$ to $SL_8$ at the front side of the sensors $S_1$ to $S_8$ are opposed to both the light-emitting portions LED and light-receiving portions P.T. of the sensors $S_1$ to $S_8$. Usually, the slits $SL_1$ to $SL_8$ are opposed to only the light-receiving portions P.T. of the sensors $S_1$ to $S_8$. The accuracy of access, however, is improved by causing the slits to oppose both the light-emitting portions LED and the light-receiving portions P.T. In this case, the width of some of the slits opposite the sensors for locating purposes is made less than that of the other slits opposite to the sensors for reading out absolute addresses to enhance the accuracy of access.

A yet further feature relates to the photosensing portion 174 for sensing reflected light and arises from the fact that the elements of the reflective patterns $P_1$ and $P_2$ used for locating operation are formed so as to overlap each other by a small amount, for example, 0.25 mm, and that the outputs of the sensors $S_1$ and $S_2$ for reading the patterns $P_1$ and $P_2$ are connected in a differential configuration. That is, the tray drives mechanism 150 is controlled according to the error signal that is the difference between the outputs from the sensors $S_1$ and $S_2$. This permits the error involved in the access, or the locating operation, to be made less than the small amount, by which the reflective patterns $P_1$ and $P_2$ overlap.

A still further feature pertains to the disc selection mechanism 200 and arises from the structure in which the locating shaft 203 and the disc push-up lever 204 are assembled into a unit and mounted to the mounting board 211 in such a way that the shaft 203 interlocks with the lever 204. Further, the shaft 203 which effects the final locating operation relative to the tray 100 and the lever 204 which pushes up the desired disc to select it are powered by the common motor 201 via the transmission mechanism 202 such that the interlock relation is established under a certain timing condition. This results in the final locating operation rlative to the tray 100 and the pushing-up of the desired disc 101 to be more certain and smooth. In addition, use of the common power source contributes to a simplification of the structure. Furthermore, the utilization permits fine adjustments of the individual components prior to their installation into the body of the apparatus, thus rendering handling more convenient.

An additional feature relates to the disc selection mechanism 200 and arises from the way the desired disc 101 is selected for access. To be more specific, the selection is attained by slightly pushing up only the disc 101 of interest from the position in the tray 100 at which the disc 101 is held. Where a larger number of discs are held in the tray 100 in the minimum space possible, the space between the neighboring discs is small. However, the feature enables the desired disc to be selected with certainty, establishing the condition suitable for loading.

The disc 101 selected from the tray 100 in the manner described above is shifted via the first and second loading mechanisms 300 and 400, respectively, to the disc pocket mechanism 500 as described already, and then the disc playback operation is made. After the completion of playback, the disc 101 played is returned to the tray 100 via the disc temporary standby mechanism 600 and the unloading mechanism 700.

Figure 18A:
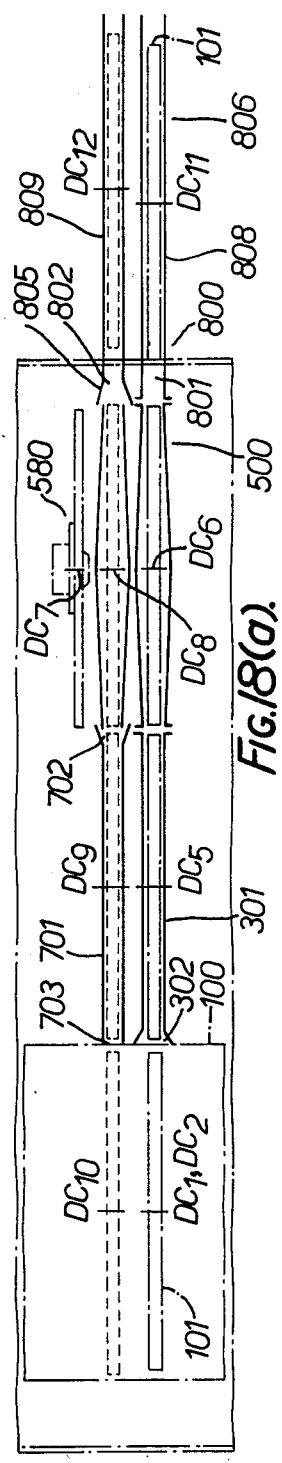
FIGS. 18(a) and (b) is a view illustrating the general process of movement of a disc.
Figure 18B:
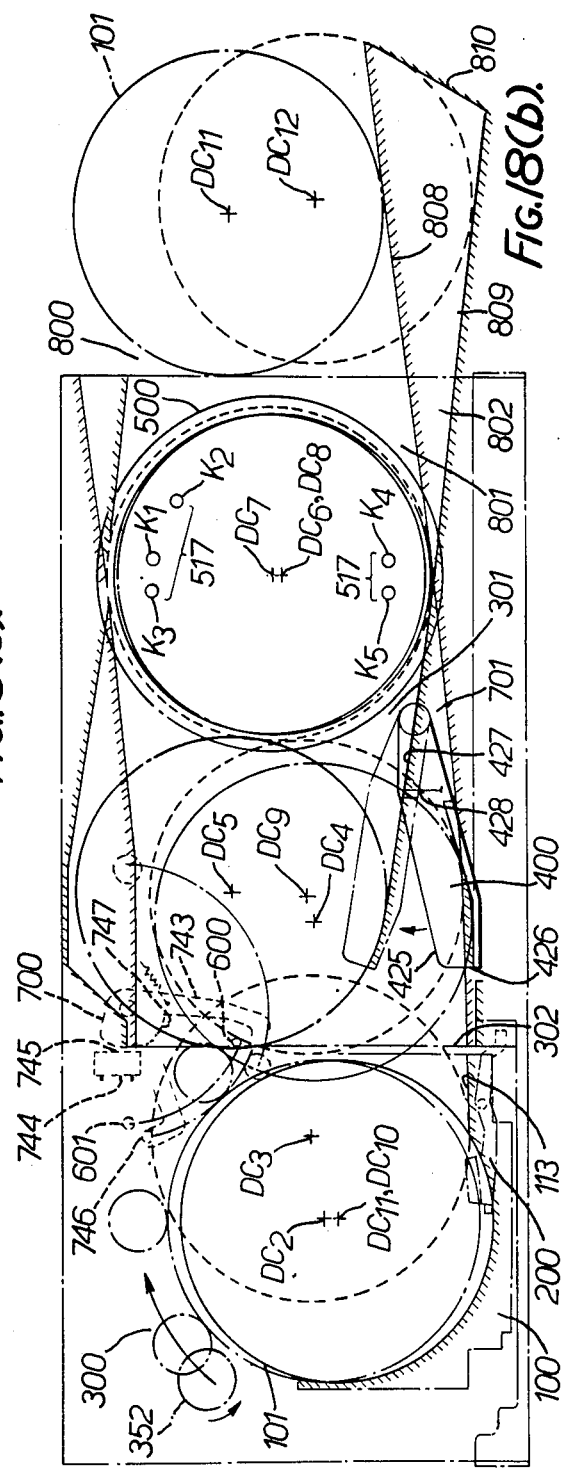

Before describing the first and second loading mechanisms 300 and 400, respectively, the manner in which the disc 101 is moved during loading and unloading operations is schematically described. FIGS. 18(a) and 18(b) show the movement of the disc 101 as viewed from the top side and the front side, respectively, of the autochanger type disc player shown in FIG. 1. In FIGS. 18(a) and 18(b), $DC_1$ through $DC_{12}$ indicate the position of the center of the disc 101, and centers of the discs 101 which are denoted by the same reference characters assume the same position.

As shown in FIGS. 18(a) and 18(b), when the disc 101 is received in the tray 100 as described above, the center of the disc assumes the position $DC_1$. Then, the disc 101 is raised by the disc selection mechanism 200 from the tray 100, when the center is moved to position $DC_2$ lying just above the position $DC_1$. The aforementioned control circuit 910 then starts the first loading mechanism 300 which rolls the disc 101 raised from the tray 100 to the right so that the disc 101 may be taken out of the tray 100. The disc 101 rolled by the mechanism 300 first rides over the front fringe 113 of the tray 100. Then, the disc 101 is transferred to a loading passage 301 formed between the tray 100 and the disc pocket mechanism 500 (FIG. 18(a)), the center being moved to position $DC_3$.

This passage 301 is shaped into the form of a narrow channel having a width slightly larger than that of the disc 101. The entrance 302 of the loading passage 301 from which the disc 101 is introduced is made wider toward its front end, as shown in FIG. 18(a), to facilitate the admission of the disc 101. After the disc 101 is moved into the loading passage 301 by the first loading mechanism 300, the disc 101 is brought to a halt in the passage, and the center takes on position $DC_4$.

Thereafter, the second loading mechanism 400 is powered and started by the first loading mechanism 300. The mechanism 400 lifts the disc 101 which is now at rest within the loading passage 301 to move the center to position $DC_5$. The passage 301 has an inclination (inclined downwardly to the right in FIG. 18(b)) to cause the disc 101 whose center has reached the position $DC_5$ to roll down by its own weight and to arrive at the take-in position (IN) in the disc pocket mechanism 500, at which time the center takes up position $DC_6$.

Then, the control circuit 910 starts the disc pocket control mechanism 550, which then moves the disc 101 past the take-out position (OUT) to the playback position (PLAY), at which the center of the disc 101 assumes position $DC_7$ slightly above the position $DC_6$ as shown in FIG. 18(b). In this condition, the disc 101 is entirely afloat in the disc pocket mechanism 500, i.e., the disc 101 is not in contact with any member in the mechanism, and the disc 101 is rotated by a disc playback mechanism 580 to play the disc 101.

After the completion of the playback operation, the control circuit 910 again starts the disc pocket control mechanism 550, which moves the disc 101 to the take-out position (OUT), at which the center lies at position $DC_8$. This take-out position (OUT) lies between the take-in position (IN) and the playback position (PLAY). The disc 101 is transferred from the take-out position (OUT) into an unloading passage 701 which extends parallel to the loading passage 301.

This unloading passage 701 is shaped like a narrow channel slightly broader than the thickness of the disc 101 in the same way as the loading passage 301. The passage 701 has an inclination (inclined downwardly to the left in FIG. 18(b)) to cause the disc 101 located in the take-out position (OUT) within the disc pocket mechanism 500 to roll down the tray 100 by its own weight. Then, it enters the unloading passage 701.

The entrance 702 of the unloading passage 701, into which the disc 101 enters, after having rolled out of the disc pocket mechanism 500, widens out toward its own front end to permit the disc 101 to enter easily, as shown in FIG. 18(a). The disc 101 that has rolled into the unloading passage 701 is temporarily held in the passage 701 by the disc temporary standby mechanism 600 such that the center is kept at position $DC_9$.

This standby condition of the disc 101 in the unloading passage 701 lasts for a certain time specified by the control circuit 910. Thereafter, the control circuit 910 starts the unloading mechanism 700, which then rolls the disc 101 that is presently in the standby condition in the unloading passage 701 to the left, as viewed in FIG. 18(b). Accordingly, the disc 101 passes across the front fringe 113 of the tray 100 into the tray 100. Thus, the disc 101 is held in the tray such that the center lies at position $DC_{10}$.

Thus, the path that the disc 101 follows during loading differs from the path that the dis 101 follows during unloading. More specifically, there exists a gap between the disc 101 in the loading passage 301 and the other disc 101 in the unloading passage 701, the gap being large enough to accomodate two discs 101 that are received in the recesses of the tray 100. In other words, the disc 101 indicated by the broken line in FIG. 18(a) is spaced a distance equivalent to the thickness of two discs 101 from the disc 101 indicated by the dot-and-dash lines.

When a desired disc 101 is selected by the disc selection mechanism 200 of the autochanger type disc player, the tray drive mechanism 150 moves the tray 100 in such a way that the disc 101 is located opposite to the entrance 302 of the loading passage 301. During this operation, the control circuit 910 controls the tray drive mechanism 160 such that the tray 100 is moved according to the addresses, that is, information about accessing discs, which are assigned to the grooves in the tray 100 as described above.

When the disc 101, which has been selected in this manner is to be returned to the tray 100 from the unloading passage 701, the control circuit 910 automatically moves the tray 100 to the position spaced a distance equivalent to two discs 101 from the position of the tray 100 corresponding to the information which was employed to shift the tray 100. Thus, it is possible to cause the groove in the tray 100 from which the disc 101 has been taken out to be opposite to the exit 703 of the unloading passage 701.

The operation for placing the emptied groove in the tray 100 opposite to exit 703 of the unloading passage 701 is effected when the disc is in standby condition in the unloading passage 701 by the disc temporary standby mechanism 600. Therefore, the disc 101 which was transferred into the tray 100 from the unloading passage 701 by the unloading mechanism 700 is restored to the original groove in the tray 100, thus completing the operations for selecting the desired disc 101 from the tray 100, playing the disc, and returning the disc 101 to the original groove in the tray 100.

As is able to be seen from FIG. 18(*a*), the exit 703 of the unloading passage 701 is narrower than the entrance 302 of the loading passage 301, that is, somewhat wider than the thickness of the disc 101. Owing to this struture, the disc 101 taken out of the tray 100 can be rapidly moved into the loading passage 301. When the disc 101 in the unloading passage 701 is carried out by the unloading mechanism 700, the disc 101 is accurately located opposite to the groove in the tray 100, and therefore the disc 101 is able to be correctly received in the groove in the tray 100. The space between each two neighboring grooves in the tray 100 is quite small to hold as many discs 101 as possible. As such, if the disc 101 is returned to the tray 100 without effecting a locating operation as described above, then the disc 101 might be received in a groove next to the correct one.

Accordingly, the disc 101 is accurately positioned by making the exit 703 of the unloading passage 701 narrower than the entrance 302 of the loading passage 301, in order to receive the disc 101 in the correct groove, as described previously. Also, it is ensured that the disc 101 taken out of the tray 100 is moved into the loading passage 301.

The operations for taking a single disc 101 out of the tray 100, playing the disc, and returning the disc 101 to the tray 100 have been described thus far. Next, the operations for taking a plurality of discs 101 out of the tray 100 in succession, playing the discs, and returning them to the tray 100 are described. First, a first disc 101 is selected from a plurality of desired discs 101 held in the tray 100, and then the disc 101 is raised from the tray 100. The first disc 101 is shifted to the take-in position (IN) in the disc pocket mechanism 500 by the first and second loading mechanisms 300 and 400, respectively, as described above. Then, the first disc 101 is played at the playback (PLAY) position.

While the first disc 101 is being played, the tray 100 is given access to the next, i.e., the second disc 101. That is, the tray 100 is moved such that the second disc 101 is opposed to the entrance 302 of the loading passage 301. Upon completion of this access operation, the second disc 101 is not yet pushed up from the tray 100.

The first disc 101 is transferred from the take-out position (OUT) to the unloading passage 701 after the completion of the playback, and then the disc 101 is brought into standby condition by the disc temporary standby mechanism 600. Under this condition, the second disc 101 is pushed up from the tray 100 which has completed the access operation for the second disc 101. Subsequently, the second disc 101 is conveyed to the take-in position (IN) in the disc pocket mechanism 500 by the action of the first and second loading mechanisms 300 and 400, respectively, and then the second disc 101 is played at the playback position (PLAY). During playback of the second disc 101, the tray 100 is moved in such a fashion that the groove in which the first disc 101 was received is disposed opposite to the exit 703 of the unloading passage 701. Then, the first disc 101, which is now in standby condition, is returned to the tray 100 by the unloading mechanism 700. During playing of the second disc 101, the tray 100 is given access to the third disc 101 for which the next playback is to be made. Then, by repeating similar operations, a plurality of discs 101 are automatically taken out of the tray 100 in succession, the discs are played, and then they are returned to the tray 100.

In the foregoing description, the tray 100 is given access to the second disc 101 to be played while first disc 101 is being played. The operation of the tray 100 for access to the second disc 101 is also able to be effected while the first disc 101 is in standby condition in the unloading passage 701.

These operations for taking a plurality of discs 101 out of the tray 100 in succession, playing of the discs, and returning them to the tray 100 are effected by the mechanisms under the sequential control of the control circuit 910. In particular, the control circuit 910 controls the mechanisms in timed sequence entirety according to the operation command signal from the control portion 900. Thus, whether the operation of the tray 100 for access to the second disc 101 is effected during the playing of the first disc 101 or while the first disc 101 is in standby state is selected by appropriately setting the sequential control function of the control circuit 910.

As described above, in the present autochanger type disc player, the discs 101 follow different paths, that is, the loading passage 301 and the unloading passage 701, depending on whether the disc player is in loading or unloading operation. Then, the first disc 101 already played is brought into standby condition during unloading operation. Under this standby condition, the next, i.e., the second disc 101, is taken out of the tray 100 in order to be played. During this playing, the first disc 101 is returned to the tray 100. Accordingly, priority is given to the loading, and it is possible to reduce the period beginning with the end of the playing of the first disc 101 and ending with the initiation of the playing of the second disc 101. Consequently, the performance of the autochanger type disc player is able to be effectively enchanced by means of the present invention.

In the description hereinbefore set forth, playback is made for the discs 101 held in the tray 100, and then they are returned to the tray 100. As described already, the present autochanger type disc player is equipped with the disc take-in/take-out mechanism 800 capable of receiving from outside discs 101 to be played and of bringing out the discs which have been already played. Although the mechanism 800 is described in greater detail later, the mechanism 800 functions to bring the disc 101 to be played, the center of which lies at position $DC_{11}$ and which is disposed outside the autochanger type disc player into the take-in position (IN) within the disc pocket mechanism 500, as shown in FIGS. 18(*a*)

and 18(b). Further, the mechanism 800 serves to bring the disc 101 lying at the take-out position (OUT) within the disc pocket mechanism 500 to an external position at which the center of the disc assumes position $DC_{12}$.

Therefore, the autochanger type disc player is able to perform various operations other than the playback operations for the discs 101 held in the tray 100 and returning them to the tray 100, by virtue of the action of the control circuit 910. For example, the disc player is able to playback the disc 101 which has been carried into the tray 100 from outside, and then the disc player is able to take the disc 101 stored in the tray 100 out of the disc player. The autochanger type disc player is able to hold the disc 101, which was carried in from outside and played, in the tray 100. In this case, while the playback operation of the disc 101 is being made, any other disc 101 is not allowed to be carried into the disc pocket mechanism 500 from outside. Namely, any external disc 101 will not be carried into the disc pocket mechanism 500 until the disc 101 in the disc pocket mechanism 500 is moved into the unloading passage 701 or carried outside the disc player.

The general process of movement of the discs 101 has been thus far described. Next, the aforementioned first loading mechanism 300, second loading mechanism 400, disc pocket mechanism 500, disc pocket control mechanism 550, disc playback mechanism 580, disc temporary standby mechanism 600, unloading mechanism 700, and disc take-in/take-out mechanism 800 are described.

First, the first loading mechanism 300 is described. Referring again to FIG. 1, two substantially arc-shaped guide rails 303 and 304 are mounted to the above-described top plate 14 and left side plate 12 and extend parallel to each other above the discs 101 received in the tray 100 and along the edges of the discs 101. The top surfaces of the guide rails 303 and 304 which are disposed in the recesses of the tray 100 are provided with teeth 305 and 306, respectively, as shown in FIG. 1.

Figure 19:
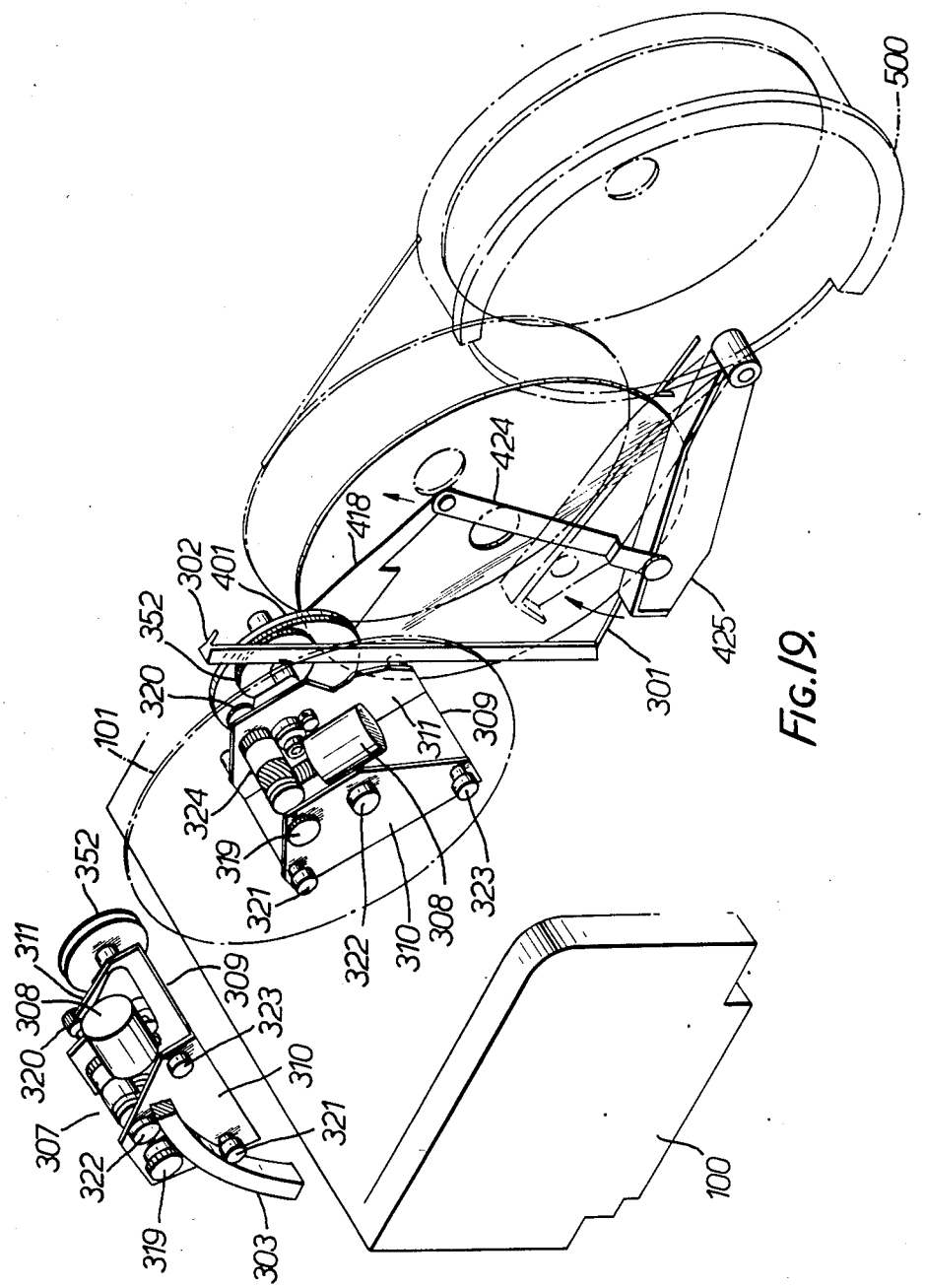
FIG. 19 is a perspective view of the first and second loading mechanism.

Referring next to FIG. 19, a loading unit 307 is mounted to the guide rails 303 and 304, it being noted that the rail 304 is not shown in this figure. The loading unit 307 incorporated an electric motor 308, and when this motor rotates in forward or reverse direction, the unit 307 is moved along the rails 303 and 304 in one direction or another.

Figure 20:
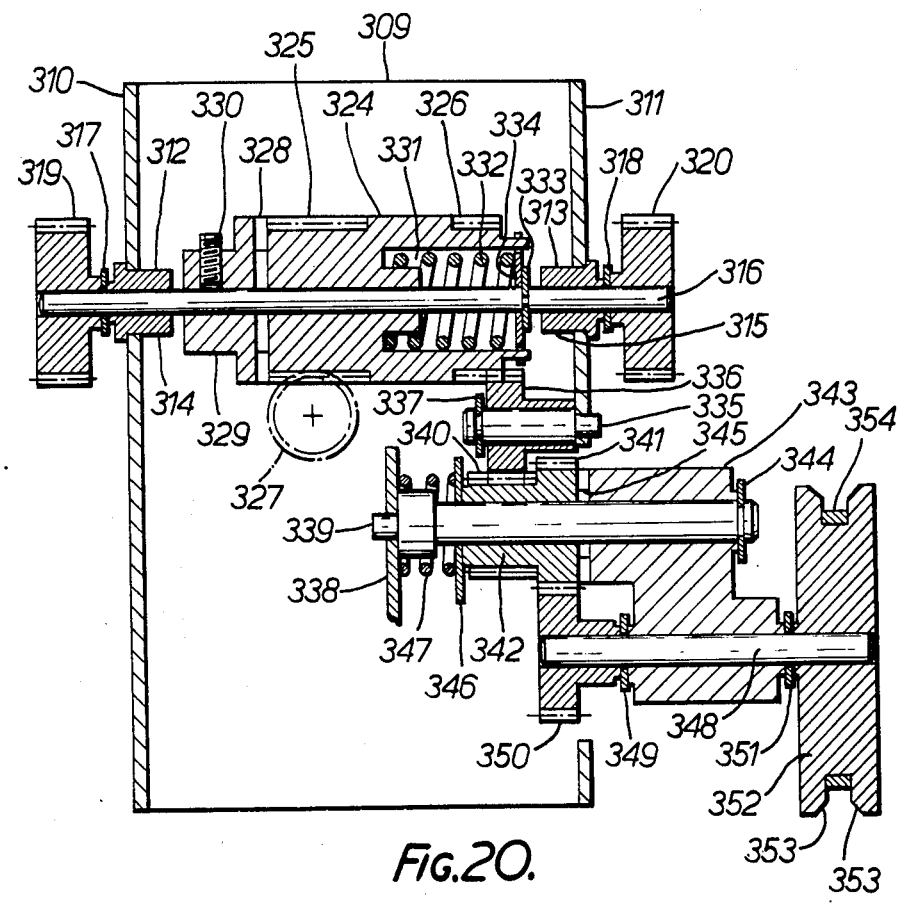
FIG. 20 is a side cross section for specifically showing the loading unit of the first loading mechanism.

The structure of the loading unit 307 is shown in FIG. 20, where a support 309 is formed by bending a metal plate into a substantially U-shaped form. The support 309 has opposed side portions 310 and 311 which are provided with holes 312 and 313, respectively, extending through them. Substantially cylindrical bearing members 314 and 315 fit into holes 312 and 313, respectively. A rotating shaft 315 rotatably extends through the bearing members 314 and 315. Both ends of the shaft 316 extend outwardly of the side portions 310 and 311 of the support 309, and moving gears 319 and 320 are mounted on these protrusions via washers 317 and 318, respectively. The gears 319 and 320 rotate together with the rotating shaft 316, and with the teeth 305 and 306, respectively, of the guide rails 303 and 304.

Referring back to FIG. 19, cylindrical guide portions 321 to 323 which alternately make contact with an outer surface and an inner surface of the guide rail 303 are mounted to one side portion 310 of the support 309. Also, other guide portions (not shown) which make contact with the rail 304 in the same manner with the above-mentioned guide portions 321 to 323 are mounted to the other side portion 311 of the support 309 so as to correspond to the guide portions 321 to 323. The guide portions 321 to 323 on one side portion 310 of the support 309, the guide portions on the other side portion, and the moving gears 319, 320 cooperate with one another to hold the loading unit 307 to the guide rails 303 and 304.

Substantially the central portion of the rotating shaft 316 is loosely inserted into a substantially cylindrical driving gear 324 that is rotatable independently of the shaft 316. The periphery of the gear 324 is formed with first and second toothed portions 325 and 326, respectively. A worm gear 327, fitted over the rotating shaft (not shown) of the motor 308, meshes with the first toothed portion 325.

The left end surface of the gear 324, as viewed in FIG. 20, is joined to a substantially cylindrical friction plate 329 via a ring-like friction member 328 made of felt, for example. The plate 329 is securely fixed to the rotating shaft 316 via a screw 330 mounted to the friction plate 329 and pressed against the shaft 316, the screw 330 being screwed into the plate 329 from the outer periphery toward the center. Hence, the plate 329 rotates together with the shaft 316. The right end surface of the driving gear 324 as viewed in FIG. 20 is substantially centrally provided with a recess 331, into which a coiled spring 332 is in contact with the bottom of the recess 331, while the other is in contact with a ring-like spring bearing plate 334 which is fixed in position by a washer 333 fixedly secured to the rotating shaft 316. Thus, the gear 324 and the friction plate 329 are so urged that they are pressed on each other via the friction member 328.

When the motor 308 is driven forwardly or reversely, the rotating force produced is transmitted to the moving gears 319 and 320 via the worm gear 327, drive gear 324, friction member 328, friction plate 329, and the rotating shaft 316. Then, the gear 319 and 320 rotate forwardly or reversely, moving the loading unit 307 in one direction or the other along the guide rails 303 and 304.

A shaft 335 has one end firmly secured to the side portion 311 of the support 309. A toothed transmission wheel 336 which meshes with the second toothed portion 326 of the driving gear 324 is rotatably and loosely mounted on the shaft 335. A ring-like gearing member 337 fitted over the other end of the shaft 335 prevents the toothed wheel 336 from coming off the shaft 335. The support 309 also has a bent support portion 338 about the center between the both side portions 310 and 311, the support portion extending parallel to the side portions 310 and 311. One end of a shaft 339 is securely affixed to the support portion 338, on which a substantially cylindrical operating gear 342 is loosely mounted. The gear 342 is made by forming first and second toothed portions 340 and 341, respectively, having different diameters integrally with each other, the first toothed potion 340 being in mesh with the toothed transmission wheel 336.

The loading lever 343 has one end loosely mounted on the front end of the shaft 339 so as to be rockable. A washer 344 is fixedly secured to the foremost end of the shaft 339 to prevent the lever 343 from coming off. A ring-like friction member 345 made of felt or the like is interposed between the lever 343 and the operating gear 342. Mounted on the left end surface of the gear 342 as viewed in FIG. 20 is a ring-like spring bearing plate 346. A coiled spring 347 is interposed between the gearing plate 346 and the support portion 338. Thus, the gear 342 and the loading lever 343 are biased in such a way that they are pressed against each other with the friction member 345 therebetween.

Rotatably and loosely mounted on the other end of the loading lever 343 is a rotating shaft 348 having one end over which a loading gear 350 is fitted. The gear 350 meshes with the second toothed portion 341 of the operating gear 342 via a washer 349. Fitted over the other end of the shaft 348 via a washer 351 is a loading pulley 352 whose peripheral and has jaws 353 that is able to hold the fringe of the disc 101 therebetween in its thickness direction. A ring-like friction member 354 made of rubber, for example, is snugly mounted between the jaws 353. The loading gear 350 and the loading pulley 352 are rotated as a unit through the intermediary of the rotating shaft 348.

The operation of the first loading mechanism 300 constructed as described above is now described with reference to FIG. 21, which shows the condition of the mechanism 300 as viewed from the front side of the autochanger type disc player shown in FIG. 1. Since the pairs of the guide rails 303, 304, the moving gears 319, 320, and the side portions 310, 311 are each shown to be one over the other, each pair is indicated by one leader line and two reference numerals.

When the first loading mechanism 300 is not driven, the loading unit 307 is situated on the left ends of the guide rails 303 and 304 as viewed in FIG. 21. Substantially L-shaped anchoring portions 355 extend laterally from the rails 303 and 304. When the loading unit 307 is in its non-driven position, the anchoring portions 355 engage with the lower end of the loading lever 343 as viewed in FIG. 20 to prevent the lever 343 from rocking downward about the shaft 339 as viewed together in FIGS. 21 and 22. Accordingly, when the unit 307 assumes its non-driven position, neither the disc 101 which is held in the tray 100 such that the center lies at the position $DC_1$ nor the disc 101 which has been raised from the tray 100 by the disc selection merchanism 200 such that the center lies at the position $DC_2$ is contacted by the loading pulley 352.

Also, when the loading unit 307 is in its non-driven position, a leaf switch 356 installed on the top plate 14 is pressed on the guide portion 322 and closed. The switch 356 serves to sense the position of the loading unit 307, and when the switch 356 is closed, that is, the loading unit 307 is in its non-driven position, the control circuit 910 is able to deliver a signal for driving the unit 307.

Under these conditions, when the disc 101 is raised from the tray 100, the motor 308 in the loading unit 307 is driven under the sequential control of the control circuit 910. The direction of rotation of the motor 308 is so controlled that the motor 308 rotates the moving gear 319 and 320 in a clockwise direction as viewed in FIG. 21. The result is that the unit 307 is shifted in the direction indicated by arrow $L_1$ along the guide rails 303 and 304, whereby the loading lever 343 moves away from the anchoring portions 355 on the rails 303 and 304. Thus, the rotating force of the motor 308 is transmitted to the lever 343 via the worm gear 327, the driving gear 324, the toothed transmission wheel 336, the operating gear 342, and the friction member 345. The rotating force is also transmitted to the loading pulley 352 via the loading gear 350 and the rotating shaft 348. Since the direction of rotation of the motor 308 is so set that moving gears 319 and 320 rotate in a clockwise direction as viewed in FIG. 21, the toothed transmission wheel 336 and the operating gear 342 are rotated counterclockwise and clockwise, respectively, as viewed in FIG. 21.

Then, a rotating force that moves the loading pulley 352 into contact with the disc 101 via the friction member 345 is driven to the lever 343. The pulley 352 itself receives a rotating force in a counterclockwise direction as viewed in FIG. 21.

Accordingly, when the loading unit 307 is moved in the direction indicated by the arrow $L_1$ in FIG. 21 to move the loading lever 343 away from the anchoring portions 355, the loading pulley 352 which rotates counterclockwise as viewed in FIG. 21 is raised from the tray 100 and pressed against the disc 101 whose center lies at position $DC_2$. At this time, the flat surfaces of the disc 101 are opposed to the jaws 353 of the pulley 352, and the peripheral end of the disc 101 is pressed on the friction member 354.

Then, the disc 101 raised from the tray 100 is rolled in such a direction as to move away from the tray 100 in FIG. 18(b). At the same time, the pulley 352 itself is moved along the guide rails 303 and 304, carrying the disc 101. Eventually, the disc 101 rolls into the loading passage 301.

As shown in FIG. 21, the right ends of the guide rails 303 and 304 are provided with stops 357 which collide with the guide portions 323 of the loading unit 307 (the guide portion of the side portion 311 is not shown) to prevent further movement of the unit 307 in the direction indicated by the arrow $L_1$. At this halt position of the unit 307, the disc 101 has been moved to such a position that the center lies at position $DC_4$ as shown in FIG. 18(b).

Rotation of the motor 308 is not stopped even if the loading unit 307 comes to a halt. In particular, when the loading unit 307 is at rest, there occurs slipping between the stopped friction plate 329 and the driving gear 324 to which the rotating force of the motor 308 is transmitted as shown in FIG. 20. The rotary motion of the gear 324 is used for the sake of the second loading mechanism 400 as described later.

Thus, the first loading mechanism 300 constructed as described above causes the loading pulley 352 in rotation to be pressed against the outer periphery of the disc 101, and therefore only a desired disc 101 is able to be taken out with certainty simply by pushing the disc 101 up from the tray 100 by about 5 mm. There arises no possibility that unselected discs 101 are taken out. Further, this structure is well suited to miniaturization. In addition, since the disc 101 rolls out of the tray 100, the disc 101 is able to be easily and smoothly taken out. Furthermore, since the disc 101 is held between the jaws 353 of the pulley 352 such that the flat surfaces of the disc 101 are in contact with the jaws 353, the disc 101 is able to be stably conveyed. When the disc 101 is guided into the loading passage 301, the disc 101 is able to be located in position, thus making the loading operation more smooth.

In addition, as the rotating force of the driving gear 324 is transmitted to the friction plate 329 via the friction mechanism consisting of the friction member 328 and the spring 332 and eventually to the moving gears 319 and 320, the rotating force imparted by the gears 319 and 320 to move the loading unit 307 along the guide rails 303 and 304 does not exceed the frictional force of the friction mechanism. This means that the push imparted to the disc 101 by the pulley 352 that is rotating is limited to a certain value. Hence, an excessively large force will not be applied to the disc 101 and so the disc 101 is able to be safely conveyed. Further, since the operating gear 342 is connected to the loading lever 343 via the friction mechanism consisting of the friction member 345 and the spring 347, the force exerted on the disc 101 by the pulley 352 is also limited to a certain value. No excessive force is applied to the disc 101 in this respect, too.

Furthermore, as is able to be understood from FIG. 20, the diameter of the toothed transmission wheel 336 is set smaller than that of the second toothed portion 326 of the driving gear 324. For this reason, the rotational frequency of the gear 336 is higher than that of the gear 324, i.e., an increase in velocity is made. The diameter of the gear 336 is substantially equal to that of the first toothed portion 340 of the operating gear 342. Further, the second toothed portion 341 of the gear 342 is substantially identical in diameter with the loading gear 350. Therefore, rotational frequency of the loading pulley 352 is higher than that of the driving gear 324, namely the rotational frequency of the moving gears 319 and 320. Hence, an increase in velocity is made.

Meanwhile, since the diameter of the loading pulley 352 is greater than that of the moving gears 319 and 320, the velocity at the periphery of the pulley 352 is higher than those of the gears 319 and 320. Thus, after the disc 101 is rolled by the rotating force of the pulley 352 itself, the loading unit follows the disc 101. Accordingly, the unit 307 will not move faster than the disc 101. That is, the unit 307 will not ride over the disc 101. Consequently, the rotating pulley 352 comes into contact with the backside of the disc 101 and pushes the disc 101 forward. In this way, the disc 101 is able to be stably moved.

The aforementioned second loading mechanism 400 is now described. Referring again to FIG. 21, when the loading unit 307 reaches the right ends of the guide rails 303 and 304, collides with the stops 357, and comes to a halt, the second toothed portion 326 of the driving gear 324 comes into mesh with a cam gear 401, which is rotatably held to a shaft 403 as shown in FIG. 22. The shaft 403 is mounted to a mounting board 402 which is disposed upright between the aforementioned main chassis 11 and the top plate 14. A washer 404 mounted on the front end of the shaft 403 prevents the cam gear 401 from coming off. The gear 401 has a toothed portion 405 and a non-toothed, flat portion 406 on its peripheral surface. As shown in FIG. 21, the flat portion 406 is provided with a substantially V-shaped notch 407. When the second toothed portion 326 of the driving gear 324 is not in mesh with the cam gear 401, an engaging portion 409 protruding from one end of a holding member 408 is situated in the deepest recesses of the notch 407.

This holding member 408 is formed by bending a metal plate into a substantially V-shaped form, and has opposed side portions 410 and 411 into which a shaft 412 mounted to the above-mentioned mounting board 402 is loosely inserted. Thus, the holding member 401 is rotatably held. One side portion 410 of this member 408 is extended to form the aforementioned engaging portion 409. The holding member 408 is biased by a torsion spring 415 in such a direction that the engaging portion 409 is urged into the notch 407, i.e., in a clockwise direction as viewed in FIG. 21. The spring 415 has a central portion wound around the shaft 412 of the holding member 408. One end of the spring 415 is fixed to the base 413 of the member 408 that connects the side portion 410 to the side portion 411. The other end is anchored to a pin 414 protruding from the mounting board 402.

When the loading unit 307 arrives at the right ends of the guide rails 303 and 304 as viewed in FIG. 21 and the second toothed portion 326 of the driving gear 324 comes into mesh with the cam gear 401, the gear 401 is rotated counterclockwise because the gear 324 is rotating in the same direction as the moving gears 319 and 320. Then, the inclined surface of the notch 407 in the cam gear 401 pushes the engaging portion 409, rotating the holding member 408 in a counterclockwise direction as viewed in FIG. 21 against the biasing force of the torsion spring 415. At this time, the engaging portion 409 enters a recess 416 formed in one side portion 310 of the aforementioned support 309, and then the flat portion 406 retains the engaging portion 409 in the recess 416. This maintains the loading unit 307 in the right ends of the rails 303 and 304 as viewed in FIG. 21.

As shown in FIGS. 21 and 22, one surface of the cam gear 401 is formed with a substantially helical groove cam 417, into which an engaging portion 419 protruding from one end of a driving lever 418 is loosely inserted. This lever 418 is formed by bending a metal plate into a substantially V-shaped form. A shaft 422 vertically mounted to the mounting board 402 extends loosely through the opposed side portions 420 and 421 of the lever 418, and therefore the lever 418 is rockably held. A washer 423 mounted on the front end of the shaft 422 prevents the lever 418 from coming off. One end of one side 420 of the lever 418 is extended to form the aforementioned engaging portion 419. The other side 421 of the lever 418 is also extended so that one end of an operating lever 424 (described later) may be rotatably connected to the front end of the extension.

When the cam gear 401 does not rotate, the driving lever 418 assumes the position indicated by the solid line in FIG. 21. Then, when the second toothed portion 326 of the driving gear 324 comes into mesh with the cam gear 401 counterclockwise as described above contact between, the groove cam 417 with the engaging portion of 419 rocks the lever 418 counterclockwise to the position indicated by the dot-and-dash line in FIG. 21.

As shown in FIG. 19, one end of a loading member 425 is rockably connected to the other end of the operating lever 424, while the other end of the member 425 is rockably held to the mounting board 402. The member 425 is mounted in the lower portion of the loading passage 301 as shown in FIG. 18(b), and is provided with a groove extending from the end, to which the lever 424 is connected, to the vicinity of the center. The disc 101 is able to be inserted into this groove, which has a bottom 426 to permit the disc 101 to be placed in the groove.

As shown in FIG. 18(b), a substantially vertical anchoring portion 428 is formed in the bottom 427 located in the lower right portion of the loading passage 301. The anchoring portion 428 is close to the center of rocking of the loading member 425 which lies on the mounting board 402. When the cam gear 401 is not rotated, the loading member 425 assumes the position indicated by the solid line in FIG. 18(b).

Consequently, the disc 101 which has been moved into the loading passage 301 by the first loading mechanism 300 is placed on the bottom 426 of the loading member 425 and bears on the anchoring portion 428, thus coming to a halt temporarily. Then, the cam gear 401 is rotated, so that the driving lever 418 is rocked in a counterclockwise direction as viewed in FIG. 21. The rocking motion of the lever 418 is transmitted to the loading member 425 via the operating lever 424. This rocks the member 425 in a clockwise direction in FIG. 18(b) while maintaining the disc 101 thereon. When the bottom 426 of the loading member 425 substantially falls into line with the bottom 427 of the loading passage 301 and the center of the disc 101 reaches the position $DC_5$, the disc 101 rolls by its own weight into the disc pocket mechanism 500.

Referring again to FIGS. 21 and 22, the other side of the cam gear 401 is provided with a wall-like cam portion 429 which closes the leaf switch 430 installed on the mounting board 402 when the cam gear 401 is rolled and the loading member 425 arrives at such a position that the loading member 425 rolls the disc 101 into the disc pocket mechanism 500 as described previously. This switch 430 acts to sense the completion of operation of the second loading mechanism 400. With the switch 430 closed, the control circuit 910 delivers a signal to reverse the motor 308 in the loading unit 307. Then, the cam gear 401 is rotated in a clockwise direction as viewed in FIG. 21, causing the notch 407 to be opposed to the engaging portion 409. This moves the engaging portion 409 away from the recess 416 and restores the loading member 425 to its original position. Also, as the moving gears 319 and 320 are rotated counterclockwise in FIG. 21, the loading unit 307 is moved along the guide rails 303 and 304 in a direction opposite to that indicated by the arrow $L_1$ into its original position.

Accordingly, in the second loading mechanism 400 as thus far described, the disc 101 which collides with the anchoring portion 428 in the loading passage 301 and temporarily stops and is caused to roll into the disc pocket mechanism 500 by its own weight by raising the loading member 425. Consequently, it is possible to convey the disc 101 in a quite systematic way and with certainty. Further, the structure is able to be made simple. In addition, since no compulsory external force is applied to the disc 101 itself to move it, an excessively large force is not imparted to the disc 101 and hence the disc 101 is able to be conveyed safely.

Next, the disc pocket mechanism 500, the disc pocket control mechanism 550, and the disc playback mechanism 580 are described in detail. Referring to FIG. 2, a partition plate 501 is mounted between the loading passage 301 and the unloading passage 701. The plate 501 is provided with a hole 502 near the abovementioned right portion 13. A cylindrical support 503 constituting the disc pocket mechanism 500 is mounted in the hole 502. Five detectors 504 to 508 (see FIG. 1) for detecting the set position of the disc are mounted at regular intervals on the other periphery on the front side of the support portion 503 as shown in FIG. 1. An engaging portion 509 having an opposed, inclined side portion is mounted at a certain position on the support portion 503, as shown in FIG. 1, to drive a clamp groove 510 extending along its inner peripheral surface. A cylindrical disc pocket member 511 receiving the disc 101 therein is angularly guided by the guide groove 510 in directions indicated by arrows $K_{10}$ and $K_{11}$ in going into and out of the support portion 503.

Figure 23A:
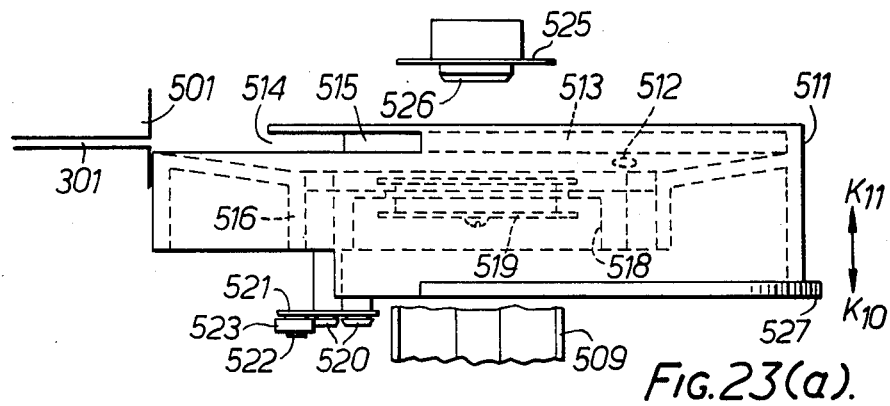
FIGS. 23(a) and 23(b) are a plan view and a front elevation, respectively, specifically showing the details of the disc pocket mechanism of FIG. 1.
Figure 23B:
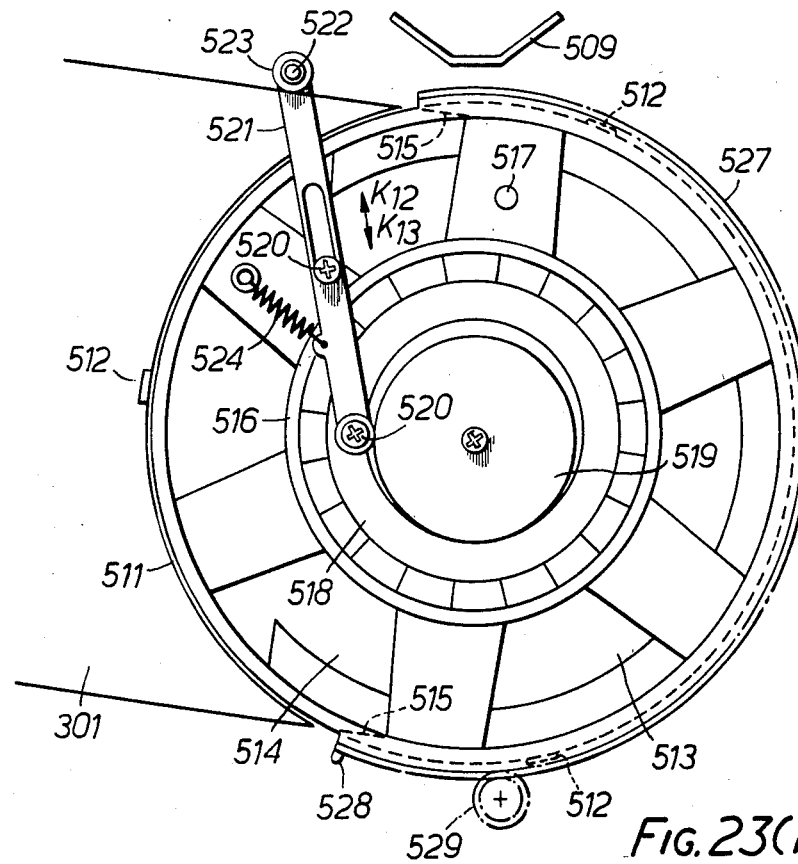

As shown in FIGS. 23(a) and 23(b), a plurality of protrusions 512 corresponding to the guide groove 510 are formed on the outer periphery of the disc pocket member 511. These protrusions 512 are angularly guided by the groove 510 in the directions indicated by the arrows $K_{10}$ and $K_{11}$ in going into and out of the support portion 503. The pocket member 511 has a pocket 513 on its base (back) side to receive the disc 101. A slit opening 514 extending through about 180° is formed at a certain position in the peripheral side wall of the pocket 513 to allow the disc 101 to go into and out of the pocket 513 through the opening 514. This opening 514 has at its opposite ends guide portions 515 inclined outward, for example, to permit the disc 101 to roll by its own weight. Under the condition that the opening 514 is opposed to the loading passage 301 and to the unloading passage 701, the guide portions 515 are made to correspond to the passages 301 and 701 so that the disc 101 may enter or exit.

The inner surface of the disc pocket member 511 is formed with a tapped portion 516 comprising several, say 10, left-handed screw threads. A position indicating mark 517 having a round shape, for example, is formed in a certain position of the tapped portion 516 to which a clamper holder 518 is screwed. A clamper portion 519 incorporating a magnet, for instance, is held to the center of the holder 518 with an appropriate clearance fit. One end of a control lever 521 is rockably secured to the front side of the holder 518 via a screw 520. The intermediate portion of the lever 521 is mounted near the tapped portion 516 of the disc pocket member 511 via the screw 520 such that the lever 521 is able to slide in direction indicated by arrow $K_{12}$ and $K_{13}$. Rotatably held via a shaft 522 to the other end of the lever 521 is a driving roller 523 which corresponds to the eagaging portion 509.

Where the opening 514 in the pocket 513 is opposed to the loading passage 301, when the disc pocket member 511 is rotated clockwise, the control lever 521 is rocked in the same direction, thereby bringing the roller 523 into engagement with the engaging portion 509 in the support portion 503. Then, the pocket member 511 is further rotated to press the lever 521 against the engaging portion 509, so that the lever 521 slides in the direction indicated by the arrow $K_{13}$ in opposition to the biasing force of a spring member 524 secured near one end of the lever 521. The lever 521 rotates the clamper holder 518 counterclockwise to move it in the direction indicated by the arrow $K_{11}$, followed by movement of the clamper portion 519 in the same direction. As a result, the magnetic force of the clamper portion 519 installs the disc 101 received in the pocket 513 in a fit portion 526 of a turntable 525 disposed on the back side of the partition plate 501, whereby the disc 101 is played.

When the disc 101 is installed on the turntable 525 by the clamper 519 of the clamper holder 518, if the disc pocket member 511 is rotated counterclockwise, the control lever 521 interlocking with the disc pocket member 511 is rocked in the same direction. Then, the roller 523 disengages from the engaging portion 509. This causes the lever 521 to be slid by the spring member 524 in the direction indicated by the arrow $K_{10}$, rotating the clamper holder 518 clockwise substantially oppositely to the direction of the clamping operation. The result is that the disc 101 which is installed on the turntable 525 by the action of the clamper portion 519 is released.

The front outer surface of the disc pocket member 511 is provided with a toothed portion 527 which extends through about 180′ in opposed relation to the opening 514 of the pocket 513. An engaging protrusion 528 is formed on one end of the toothed portion 527 to detect the angular position, corresponding to the five detectors 504 to 508. As shown in FIG. 2, the toothed portion 527 of the pocket member 511 is connected with a toothed wheel 532 via first and second toothed wheels 529 and 530. The wheel 532 is held to an electric motor 531 that controls the disc pocket mechanism 500. Thus, as the motor 531 is driven, the pocket member 511 is rotated. Since the disc pocket member 511 goes into and out of the support portion 503 in response to the rotation, the first toothed wheel 529 meshing with the toothed portion 527 is formed so as to correspond to the stroke traveled. The motor 531 drives the disc pocket mechanism 500 under the control circuit 910 in the manner described later.

As also shown in FIG. 2, an auxiliary chassis 533 constituting the aforementioned disc playback mechanism 580 is juxtaposed to the back side of the partition plate 503. The turntable 525 is rotatably disposed substantially at the center of this chassis 533. The back side of the turntable 525 is connected to the rotating shaft (not shown) of an electric motor 534 for driving the turntable 525. Thus, the turntable 525 is rotated so as to assume a desired condition under the control circuit 910. One end of the chassis 533 which corresponds to the turntable 525 is provided with a guide hole 535 to guide an optical pickup 536 which is inserted in the guide hole 535. The pickup 536 is able to be moved by a pickup feed mechanism (not shown) from the inner portion of a recorded area on the disc 101 toward the outer portion. While the pickup 536 is moved in a given way under the control of the control circuit 910, the disc 101 is illuminated by a laser beam, and the reflected beam is detected to read recorded signals from the disc 101.

Figure 24A:
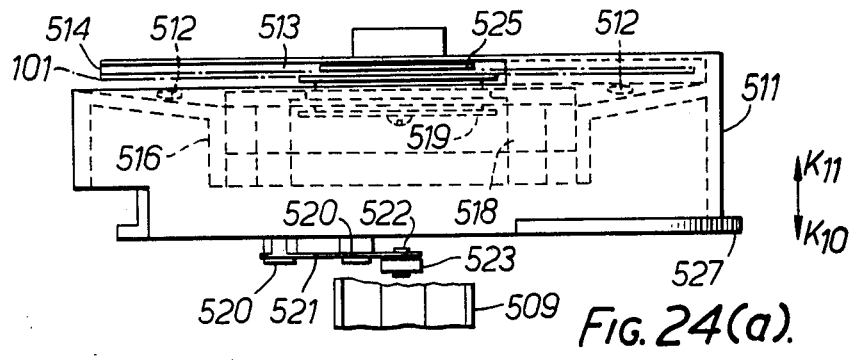
FIGS. 24(a), 25(a), 26(a) and 27(a) are plan views illustrating the operation in FIG. 23(a)
Figure 24B:
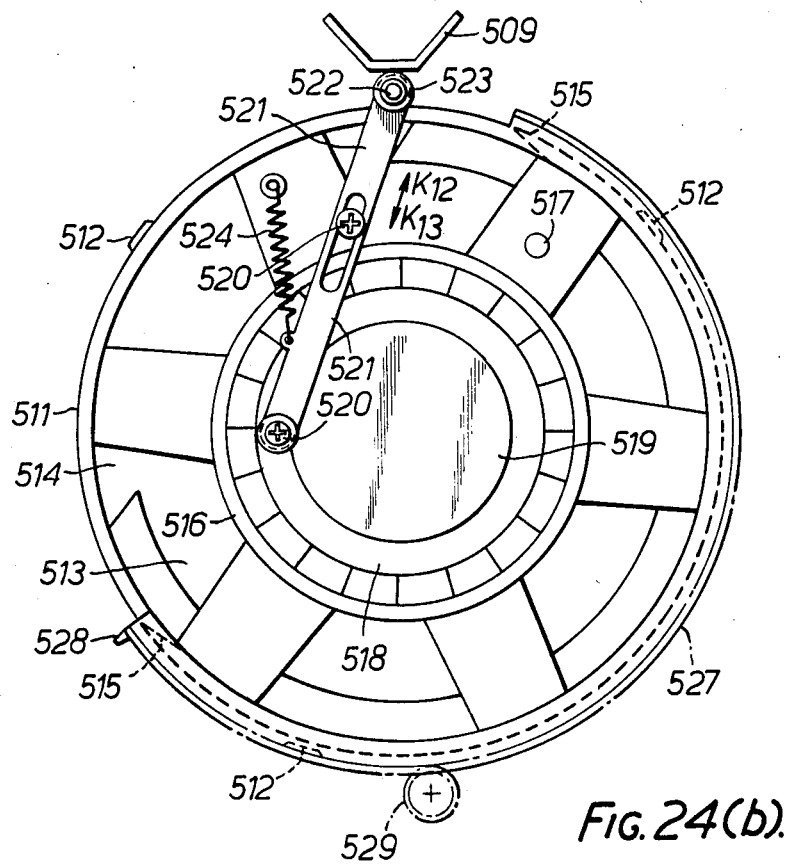
FIGS. 24(b), 25(b), 26(b) and 27(b) are front elevations illustrating the operation in FIG. 23(b)

The operation of the aforementioned disc pocket mechanism 500 for setting the disc 101 is now described. The disc pocket member 511 receiving the discs 101 is controlled by the control circuit 910 as described already. Usually, the display portion 517 of the pocket member 511 is placed in position $K_1$ (FIG. 18(b)), at which the engaging protrusion 528 keeps the second detector 505 in on condition, thereby de-energizing the motor 531. At this time, as shown in FIGS. 23(a) and 23(b), the opening 514 of the pocket 513 in the pocket member 511 faces the incline of the loading passage 310 such that the disc 101 is able to be carried into the pocket 513 by the second loading mechanism 400. After the disc 101 has been moved into the pocket 513, the toothed portion 527 of the pocket member 511 is driven in a clockwise direction by the motor 513. When the position indicating mark 517 of the member 511 reaches position $K_2$ (FIG. 18(b)), i.e., the disc playback position, the engaging protrusion 528 turns on the third detector 506 to stop the operation of the motor 531 again. At this time, the disc pocket member 511 is angularly moved in the direction indicated by the arrow $K_{11}$ as mentioned above, and therefore the clamper 518 is rotated counterclockwise as shown in FIGS. 24(a) and 24(b). This moves the clamper portion 519 further in the direction indicated by the arrow $K_{11}$. As a result, the magnetic force of the clamper portion 519 renders the disc 101 in the pocket 513 rotatable on the turntable 525 as observed above. Then, the playing of the disc 101 occurs by using the pickup 536.

After the completion of the playing of the disc 101 received in the pocket 513, the motor 531 is reversed under the control of the control circuit 910, and then the disc pocket mechanism 500 drives the disc pocket member 511 counterclockwise. The clamper holder 518 is rotated in the same direction to the reverse rotation of the member 511, leading to disengagement of the roller 523 of the control lever 521 from the engaging portion 526 as noted above. Thus, the biasing force of the spring member 524 effects an operation substantially opposite to the aforementioned clamping operation, whereby the disc 101 is freed from the attachment to the turntable 525 due to the clamper portion 519.

Figure 25A:
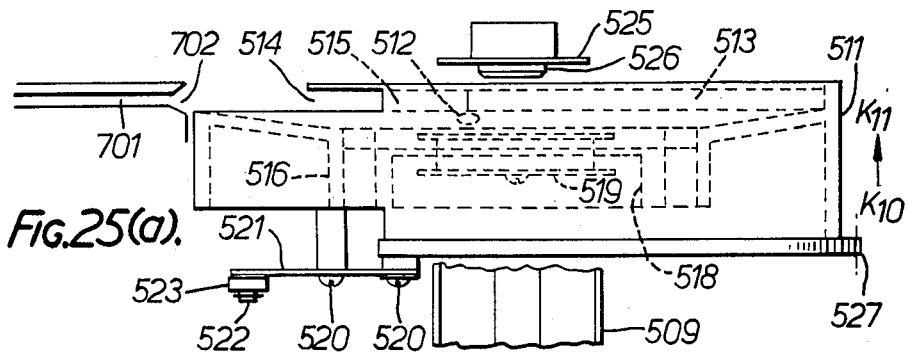
Figure 25B:
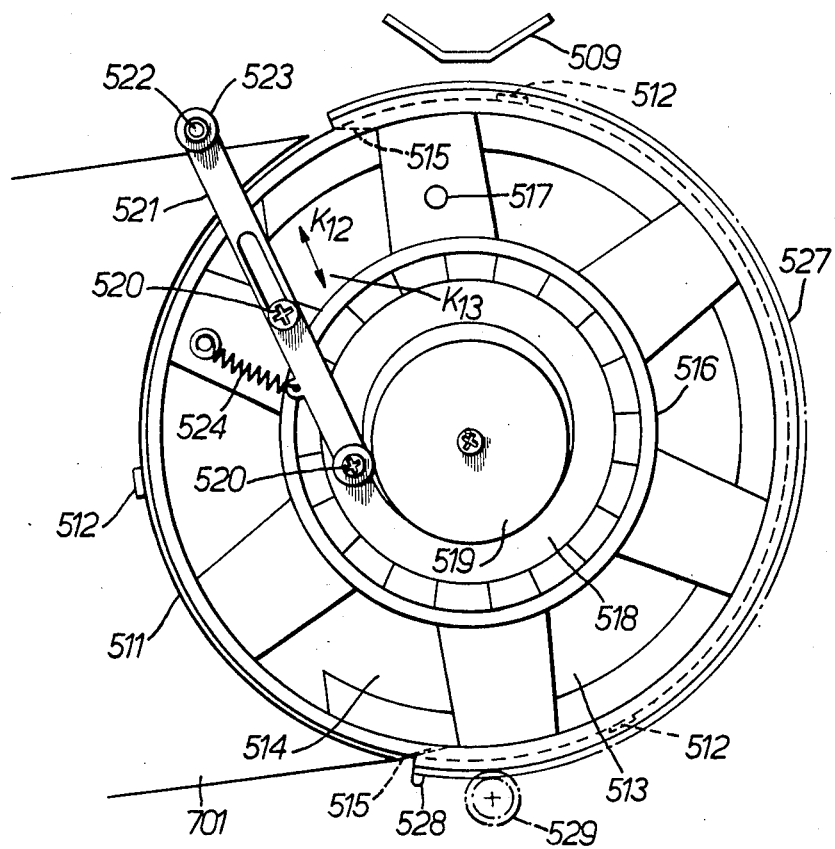

Meanwhile, when the position indicating mark 517 on the disc pocket member 511 arrives at position $K_3$ (FIG. 18(b)), the engaging protrusion 528 turns on the first detector 504 to de-energize the motor 531. At this time, the opening 514 of the pocket 513 in the pocket member 511 faces the incline of the unloading passage 701, as shown in FIGS. 25(a) and 25(b), and the disc 101 is carried into the disc temporary standby mechanism 600.

After the disc 101 is moved from the pocket 513 in the disc pocket member 511 into the disc pocket standby mechanism 600, the motor 531 is again reversed by the control circuit 910, so that the motor 531 rotates clockwise. When the position indicating mark 517 on the pocket member 511 reaches the position $K_1$ (FIG. 18(b)) again, the engaging protrusion 528 causes the second detector 505 to turn on to de-energize the motor 531 as mentioned already. Thereafter, the opening 514 of the pocket 513 in the disc pocket member 511 is placed opposite the incline of the loading passage 301, and then the next disc 101 is carried into the loading passage 301 by the second loading mechanism 400. Subsequently, the disc pocket member 511 performs the disc setting operation again to install the next disc 101 held in the pocket 513 onto the turntable 525 in such a condition that the disc 101 is able to be played. Then, the playing of the disc 101 is made by the disc playback mechanism 580. The disc 101 carried into the disc temporary standby mechanism 600 is transferred into a given position in the tray 100 by the unloading mechanism 700. The disc setting operation is repeatedly carried out according to the above procedures.

The structure of the aforementioned disc take-in/take-out mechanism 800 is now described. As shown in FIGS. 18(a) and 18(b), the partition plate 501 is provided with a disc take-in passage 801 and a disc take-out passage 802 which are substantially opposed to the loading passage 301 and the unloading passage 701, respectively, on the right side of the disc pocket mechanism 500. The take-in passage 801 is tilted to roll the disc 101 toward the mechanism 500, i.e., inward, while the take-out passage 802 is tilted to roll the disc 101 outward. As viewed together with FIG. 2 right side plate 13 is provided with a disc take-in port 804 and a disc take-out port 803 which are opposed to the passage 801 and 802, respectively. The ports 801 and 802 are vertically spaced from each other so as to correspond to the inclinations of the passages 801 and 802. Each of the ports 803 and 804 has a wider intermediate portion. The take-out port 804 is narrower than the take-in port 803. The one end of the take-out passage 802 which is opposed to the disc pocket mechanism 500 is provided with a tapering entrance 805.

A disc take-in/take-out member 806 is mounted by means of a screw 807 to the main chassis 11 which is opposed to the ports 803 and 804. The take-in/take-out member 806 is provided with a first guide groove 808 for introducing the disc and a second guide groove 809 for taking the disc out. The grooves 808 and 809 are inclined so as to correspond to the take-in passage 801 and the take-out passage 802, respectively. The second groove 809 is formed with an inclined limit portion 810 at its front end to prevent the disc 101 from coming off.

One specific example of the appearance of the disc take-in/take-out mechanism 800 mounted and constructed as described above is shown in FIG. 28. This mechanism 800 protrudes from the housing surface 10 so that the mechanism 800 is able to be drawn out. The mechanism 800 is covered by a cover 811 as indicated by the dot-and-dash line to prevent dust or the like from contaminating the mechanism 800.

Figure 26A:
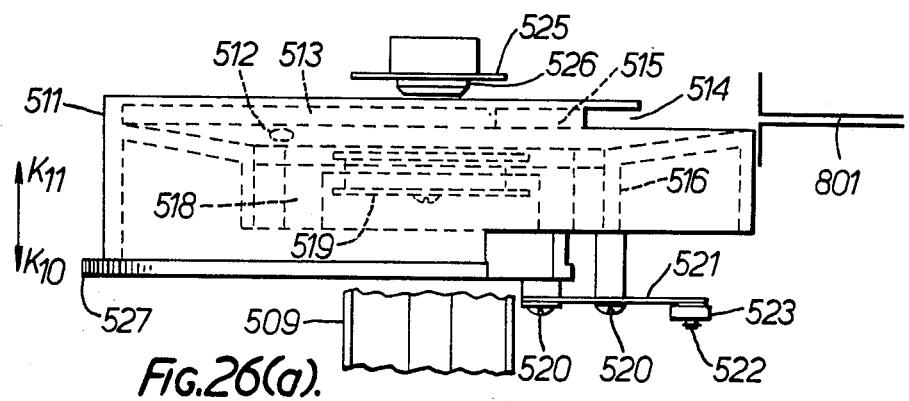
Figure 26B:
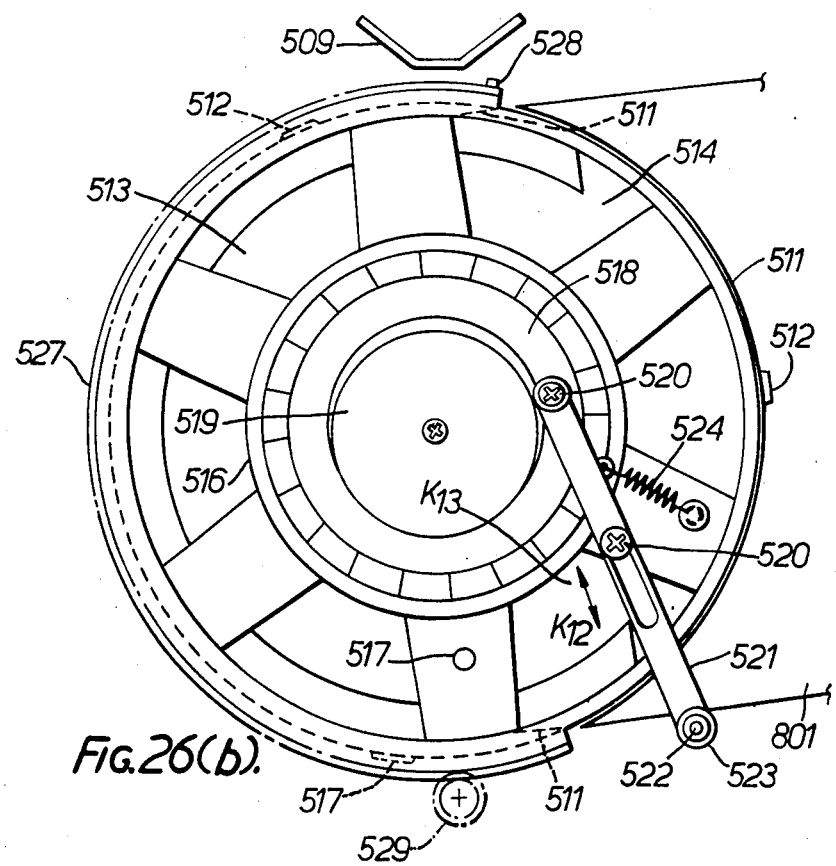

The setting operation effected by the disc take-in/take-out mechanism 800 is now described. In order to take in or out the disc 101 using the mechanism 800, the disc pocket mechanism 500 is brought into a given state relative to the disc take-in/take-out member 806. In particular, the motor 531 is driven in a certain direction under the control of the control circuit 910 to rotate the disc pocket member 511 clockwise for causing the member 511 to face the loading passage 301. When the member 511 is shifted to position $K_4$ (FIG. 18(b)) from the above position $K_1$, the engaging protrusion 528 of the display portion 517 makes the fourth detector 507 (see FIG. 1) turn on to de-energize the motor 531. At this time, as shown in FIGS. 26(a) and 26(b), the opening 514 of the pocket 513 in the pocket member 511 is placed opposite to the incline of the disc take-in passage 801. As a result, the disc 101 which is introduced in the first guide groove in the take-in/take-out member 806 is moved into the pocket 513 in the disc pocket member 511 through the take-in port 803 and the take-in passage 801. Then, the motor 531 is reversed by the control circuit 910, as described above, to rotate the disc pocket member 511 counterclockwise. When the position indicating mark 517 reaches the position $K_2$ (FIG. 18(b)), or the disc playback position, the engaging protrusion 528 of the pocket member 511 makes the third detector 506 turn on, thereby de-energizing the motor 531 again. At this time, as shown in FIGS. 24(a) and 24(b), the roller 523 of the control lever 521 is brought into engagement with the engaging portion 509 and so the clamper holder 518 of the disc pocket member 511 is urged in the direction indicated by arrow $K_{13}$. Since the holder 518 is rotated counterclockwise and moved in the direction indicated by arrow $K_{11}$, as described above, the clamper portion 519 installs the disc 101 received in the pocket 513 onto the turntable 525. Then, the disc 101 is played in the disc playback mechanism 580.

After completing the playing of the disc 101 in the pocket 513, the motor 531 is reversed by the control circuit 910 to drive the disc pocket member 511 of the mechanism 500 clockwise. As the clamper holder 518 interlocks with the pocket member 511, the holder 518 is rotated in the same direction as the member 511, disengaging the roller 523 of the lever 521 from the engaging portion 509. Then, the biasing force of the spring member 524 restores the lever 521 in the direction as indicated by arrow $K_{12}$. Consequently, the clamper portion 519 performs an operation substantially opposite to the above-mentioned clamping operation, causing the clamper portion 518 to cease to install the disc 101 on the turntable 525.

Figure 27A:
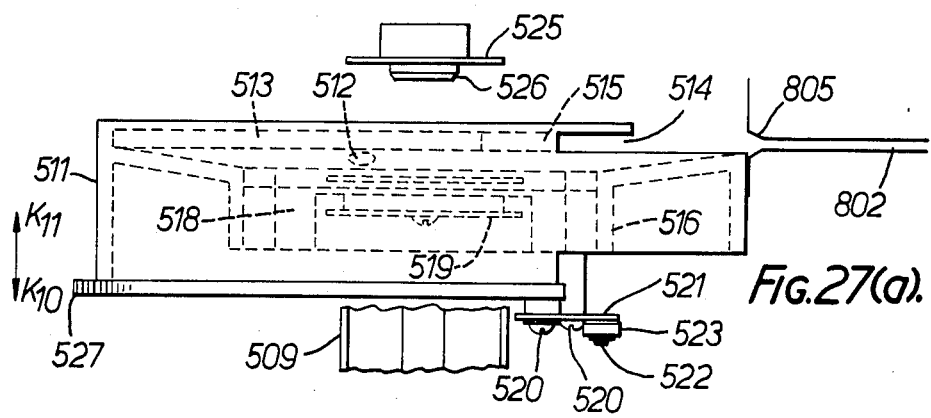
Figure 27B:
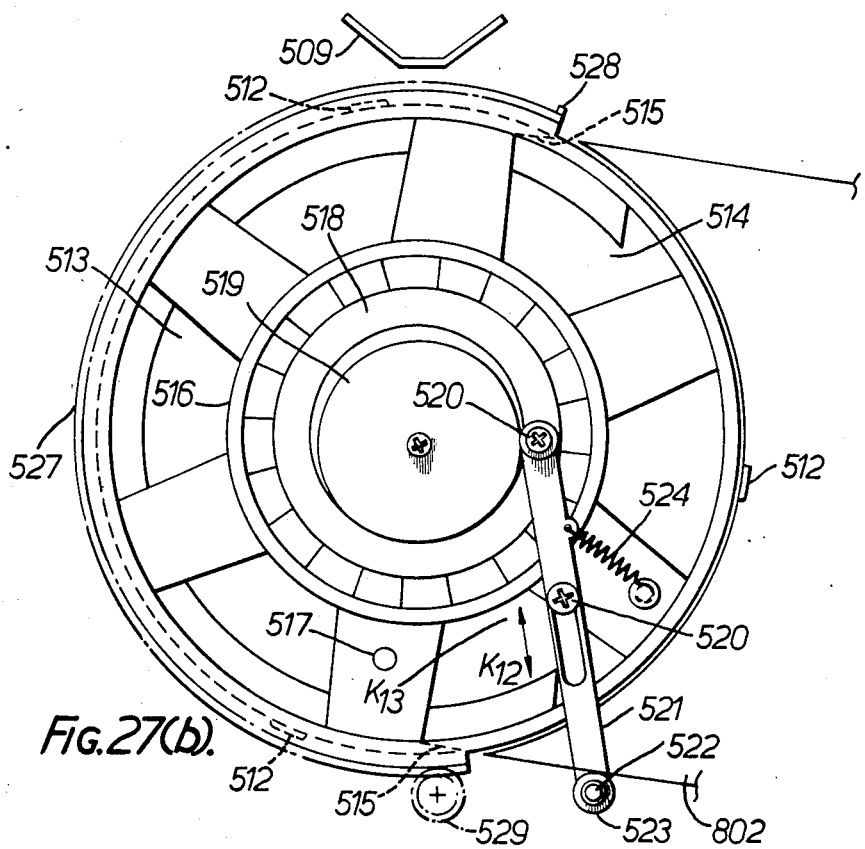
Figure 28:
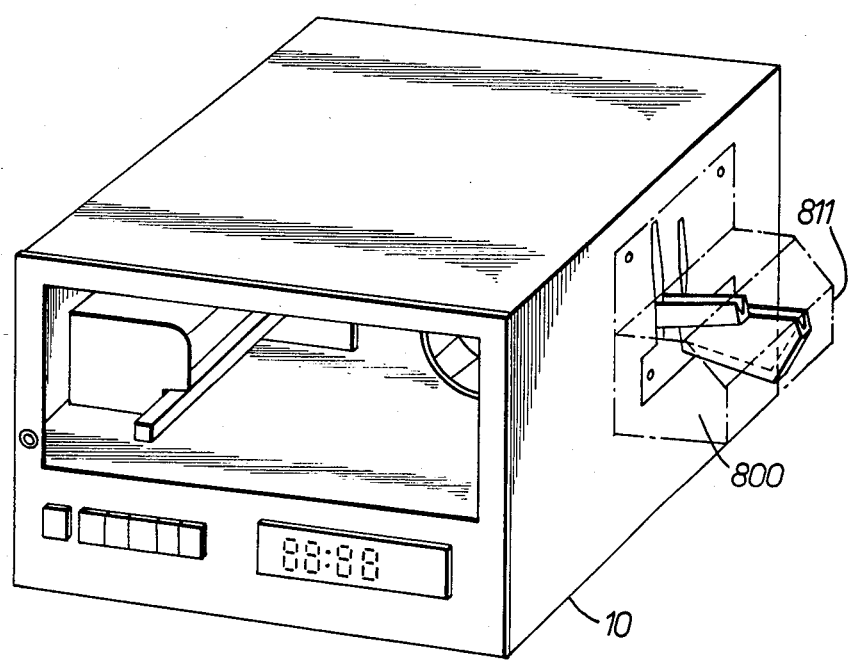
FIG. 28 is a perspective view showing the appearance of a specific example of the disc take-in/take-out mechanism shown in FIG. 1.

Meanwhile, when the position indicating mark 517 reaches position $K_5$ (FIG. 18(b)), the engaging protrusion 528 of the disc pocket member 511 makes the fifth detector 508 turn on, thereby stopping the operation of the motor 531. At this time, as shown in FIGS. 27(a) and 27(b), the opening 514 of the pocket member 511 is placed opposite to the incline of the disc take-out passage 802, and then the disc 101 is moved into the second guide groove 809 in the take-in/take-out member 806. The rolling movement of the disc 101 conveyed into the groove 809 is limited by the limit portion 810 and hence the disc 101 is prevented from coming off. Then, the motor 531 is reversed again by the control circuit 910 to place the opening 514 of the pocket 513 in the disc pocket mechanism 500 opposite to the disc take-out passage 802. Thus, discs 101 are repeatedly set by the above procedures.

It is to be noted that the disc 101 is allowed to be moved into or out of the disc pocket mechanism 500 only if the opening 514 of the pocket 513 in the mechanism 500 is opposed to the loading passage 301, the unloading passage 701, the take-in passage 801, or the take-out passage 802. Where the opening 514 of the pocket 513 in the mechanism 500 faces the loading passage 301, the introduction of the disc 101 from the take-in/take-out mechanism 800 is prevented. Where the opening is opposed to the the take-in passage 801, the introduction of the disc from the loading passage 301 is not allowed.

It is to be understood that the disc pocket mechanism 500 is not limited to the aforementioned controlled operation, but rather it is also able to perform various other operations by setting of the control circuit 910. For example, the disc pocket mechanism 500 acts to enter the disc 101 carried from the take-in/take-out mechanism 800 into the tray 100 through the unloading passage 701. When a given number of discs 101 are received in the tray 100, it is possible to add a disc 101 for the sake of automatic playback. In this case, the discs 101 that is received in the tray 100 may be brought into standby condition in the disc temporary standby mechanism 600. Under this condition, playback of the next disc 101 is made. This permits an increase in the number of discs employed.

Also, since the disc pocket mechanism 500 serves to transport the disc 101, which was carried into the mechanism 500 from the tray 100 via the loading passage 301, to the outside via the take-in/take-out mechanism 800, the disc 101 is able to easily be taken out of the tray 100.

The characteristics of the disc pocket mechanism 500, the disc control mechanism 550, and the disc take-in/take-out mechanism 800 are hereinafter described.

A first feature relates to the disc pocket mechanism 500 and arises from the structure in which the pocket mechanism 500 is so rotated forward or backward so that the opening 514 of the pocket 513 in the pocket member 511 is opposed to the loading passage 301, the unloading passage 701, the disc take-in passage 801, or the disc take-out passage 802. This simplifies the structure of the mechanism 500 but assures a reliable control, and therefore it contributes to the miniaturization.

A second feature is that the disc pocket member 511 is able to be angularly moved to first, second, and third positions, at which introduction of the disc 101, playback, and take-out of the disc 101 are respectively effected. The disc playback position does not lie at the same position as the disc introduction position and the take-out position. This certainty prevents the disc 101 from going into and out of the disc pocket member 511 under the condition of playback of the disc 101, thereby making the controlled operation of the disc pocket mechanism 500 more certain.

A third feature is that the clamper holder 518 is able to be angularly moved into and out of the disc pocket mechanism 500 which is able to assume first, second, and third positions where introduction of disc 101, playback, and take-out of the disc 101 are respectively effected, and that the clamper holder 518 interlocks with the disc pocket member 500 in the second position assumed by the mechanism 500. That is, the clamper portion 519 of the clamper holder 518 interlocks with the pocket member 511 at said second position, thus rendering the operation of the clamper holder 518 as certain as possible.

A fourth feature is that the opening 514 of the pocket 513 is provided with the guide portion 515 to cause the disc 101 to roll by its own weight. When the disc take-out passage 802 from the pocket 513, the disc 101 is rolled out of the guide portion 515, thus, making the controlled movement of the disc as certain as possible.

It is also possible to from the guide portion 515 in the opening 514 of the pocket 513 into a stepped shape so that the disc 101 may roll out by its own weight. In this case, the disc 101 goes into or out of the pocket 513 under the condition that the guide portion 515 corresponds to the loading passage 301, the unloading passage 701, the disc take-in passage 801, and the disc take-out passage 802.

A fifth feature is that the disc take-in/take-out member 806 is disposed outside to receive the disc taken out of the tray 100. Namely, this member 806 serves as a disc receiver when the disc 101 is carried in from outside or carried out, whereby the holding of the disc 101 from outside is able to be greatly improved.

The disc 101 rolled out of the disc pocket mechanism 500 in this way is brought into standby condition in the unloading passage 701, and then the disc 101 is returned to the tray 100 by the unloading mechanism 700. These mechanisms 600 and 700 are next described in detail.

Figure 29:
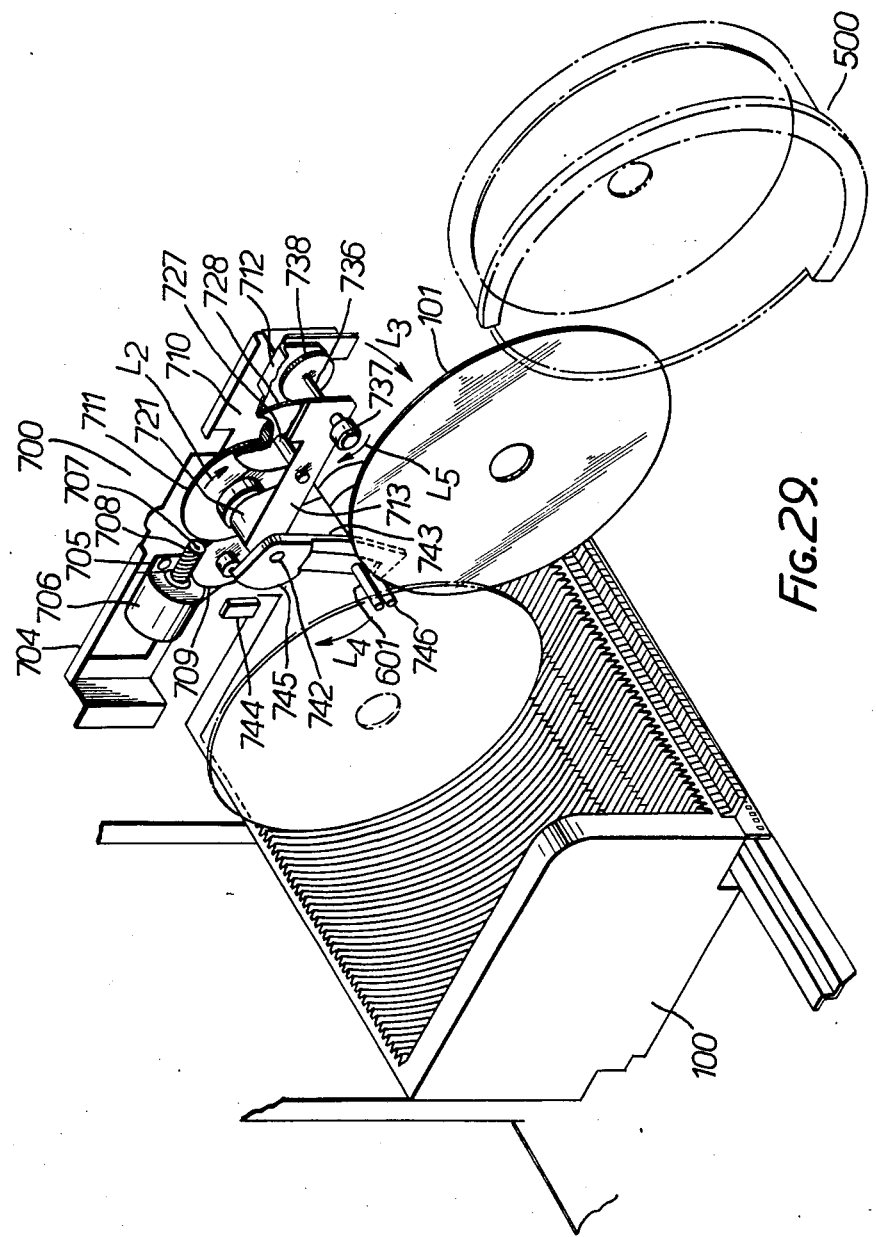
FIG. 29 is a perspective view of the disc temporary standby mechanism and the unloading mechanism.

Referring to FIG. 29, the disc 101, which is rolled into the unloading passage 701 from the disc pocket mechanism 500 after completion of playback, is caused to bear on a substantially cylindrical anchoring portion 601, so that the disc 101 takes on standby condition in the unloading passage 701. The engaging portion 601 is connected to the unloading mechanism 700. Also shown in FIG. 29 is a frame 704 securely fixed to the aforementioned top plate 14 (not shown in FIG. 29). An electric motor 706 is mounted to the frame 704 via a fixture 705 and has a rotating shaft 707 on which a worm gear 708 is mounted. The worm gear 708 meshes with a driving gear 709 that is rotatably held to the frame 704. The gear 709 meshes with a friction gear 711 in the unloading unit 710.

Figure 30:
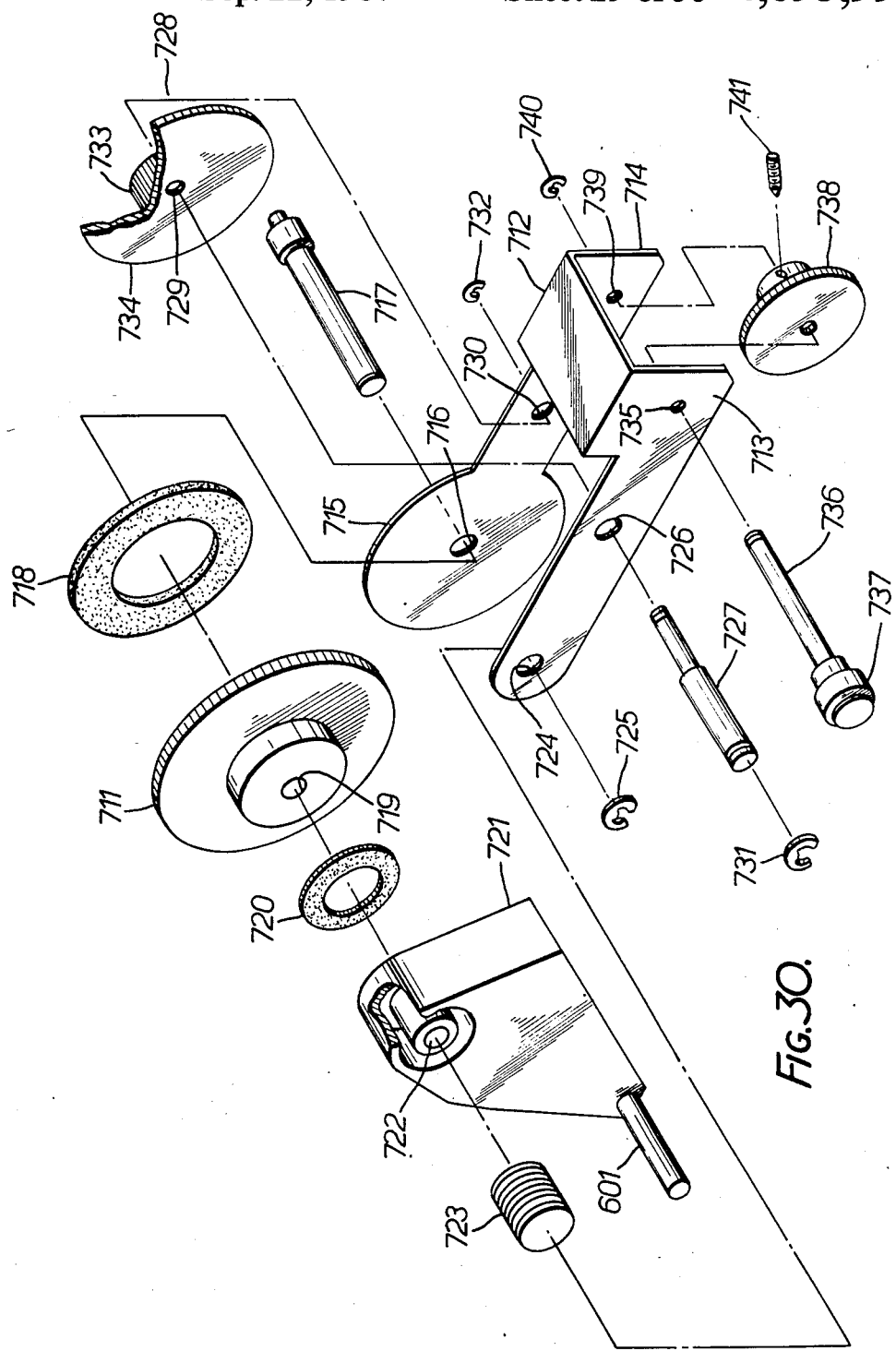
FIG. 30 is an exploded perspective view specifically showing the unloading unit of the unloading mechanism.

Referring next to FIG. 30, the unloading unit 710 is specifically shown. Indicated by reference numeral 712 is an unloading member which may be formed by bending metal plate substantially into a U-shaped form. The opposed side portion 713 and 714 of the member 712 extended in the same direction. The front end of the one side portion 714 is shaped like a disc to constitute a friction portion 715 that is centrally provided with a hole 716. A shaft 717 extends from outside of the friction portion 715 of the unloading member 712 into the hole 716 such that the shaft 717 is loosely inserted into the hole 716. This shaft 717 is loosely inserted into an annular friction member 718 made of felt or the like, a hole 719 formed in the center of the friction gear 711, an annular friction member 720, a hole 722 extending through one end of an operating lever 721, a coiled spring 723, and a hole 724 extending through a side portion 713 of the unloading member 712. An E-ring 725 is fitted over the front end of the shaft 717 to prevent these components from coming off.

The portion of the shaft 717 which protrudes outwardly of the friction portion 715 of the unloading member 712 is securely fixed to the frame 704. Therefore, the unloading member 712 is held to the frame 704 in such a way that the unloading member 712 is able to rotate about the shaft 717. The friction gear 711 is rotatable about the shaft 717. Also, the operating lever 721 is angularly movable about the shaft 717. The friction portion 715 of the unloading member 712, the friction members 718, 720, the friction gear 711, and the operating lever 721 are pressed against one another by means of a spring 723. The above-mentioned anchoring portion 601 is mounted to the other end of the lever 721. It is to be noted that even if the unloading member 712 is rotated around the shaft 717, the driving gear 709 is kept in mesh with the friction gear 711.

One side portion 713 of the unloading member 712 is centrally provided with a hole 726. A shaft 727 is loosely inserted into the hole 726 from outside of the side portion 713. A toothed transmission wheel 728 is centrally provided with a hole 729. The shaft 727 is loosely inserted into the hole 729 and also into a hole 730 which extends through the other side portion 714. The portions of the shaft 727 which protrude out from the side portions 713 and 714 of the unloading member 712 have E-rings 731 and 732, respectively, fitted over them to prevent the shaft 727 from coming off. The toothed transmission wheel 728 has a first toothed portion 733 of a smaller diameter and a second toothed portion 734 of a larger diameter, the first toothed portion 733 meshing with the friction gear 711.

The base of the side portion 713 of the unloading member 712 is provided with a hole 735. A shaft 736 extends from outside of the side portion 713 into the hole 735, and is loosely inserted into the hole 735. An unloading roller 737 is mounted to the portion of the shaft 736 which protrudes outwardly of the side portion 713. The shaft 736 is loosely inserted into both an unloading gear 738 and a hole 739 that extends through the other side portion 714. An E-ring 740 is fitted over the front end of the shaft 727 to prevent the components from coming off. The gear 738 is fixedly secured to the shaft 736 by a screw 741 so that the gear 738 may rotate together with the shaft 736. The unloading gear 738 is in mesh with the second toothed portion 734 of the toothed transmission wheel 728.

Referring again to FIG. 29, a shaft 742 is vertically mounted to the aforementioned mounting board 402 in a certain portion. One end of a detecting lever 743 is rockably held to the shaft 742. The rockable base of the lever 743 is provided with a cam portion 745 that engages with a microswitch 744 installed on the frame 704. The switch 744 acts to sense the introduction of the disc 104 into the tray 100 as described in greater detail later. A detecting pin 746 is vertically mounted to the other end of the lever 743, and extends substantially parallel to the aforementioned engaging portion 601.

In the operation of the unloading mechanism 700 constructed as thus far described, the disc 101 which was played is rolled into the unloading passage 701 from the disc pocket mechanism 500 as described already. Then, the disc 101 strikes on the anchoring portion 601 and comes to a halt, assuming standby condition. Simultaneously, the next disc 101 to be played is taken out of the tray 100 and moved into the disc pocket mechanism 500 to be played. During this playing, the motor 706 is driven under the sequential control of the control circuit 910.

The rotation of the motor 706 is transmitted to the friction gear 711 via the driving gear 709. The direction of the rotation of the motor 706 is so controlled that the friction gear 711 is rotated in the direction indicated by arrows $L_2$ in FIG. 29. This rotation of the gear 711 in the direction of the arrow $L_2$ is then transmitted to the unloading member 712 via the friction member 718 and also to the operating lever 721 via the friction member 720. Then, the unloading member 712 is given a rotational force that moves the unloading roller 737 into contact with the side of the disc 101 which is now on standby, i.e., in the direction of the arrow $L_3$ in FIG. 29. Also, the anchoring portion 601 of the operating lever 721 is given a rocking force in the direction indicated by arrow $L_4$ in FIG. 29, so that the anchoring portion 601 moves away from the disc 101. Consequently, the disc 101 comes out of engagement with the anchoring portion 601 and is able to move toward the tray 100.

Meanwhile, the rotational force of the friction member 711 in the direction of the arrow $L_2$ is transmitted to the unloading roller 737 via the toothed transmission wheel 728, the unloading gear 738, and the shaft 736. Then, the roller 737 is rotated in such a direction that the roller 737 rolls the disc 101 which is on standby toward the tray 100, i.e., in the direction indicated by arrow $L_5$ in FIG. 29.

Accordingly, the unloading roller 737 rotated in the direction of the arrow $L_5$ is moved in the direction of the arrow $L_3$ and pressed on the periphery of the disc 101 that is in standby condition, causing the disc 101 to roll toward the tray 100. The unloading roller 737 is shifted in the direction of the arrow $L_3$ to push the rolling disc 101. Eventually, the disc 101 is returned to the tray 100 as shown in FIG. 31.

When the disc 101 is conveyed from its standby position toward the tray 100 as mentioned above, the outer periphery of the disc 101 pushes the detecting pin 746, rocking the detecting lever 743 in substantially the same direction as the operating lever 721, i.e., in the direction of arrow $L_4$ in FIG. 29. If the lever 743 lies at the position shown in FIG. 29, the cam portion 745 turns on the microswitch 744. Then, the disc 101 is moved toward the tray 100 until the center of the disc 101 reaches the position $DC_3$, as shown in FIG. 18(b), in which the lever 743 has been fully rocked clockwise. At this time, the recess 747 formed in the cam portion 745 is caused to face the microswitch 744, thereby turning off the switch 744.

When the disc 101 is entirely received in the tray 100, the detecting lever 743 returns by its own weight to the position shown in FIG. 29 without allowing its detecting pin 746 to make contact with the disc 101. Then, the cam portion 745 turns on the microswitch 744 again, enabling the control circuit 910 to sense the full introduction of the disc 101 into the tray 100. Then, the control circuit 910 reverses the motor 706 to return the unloading member 712 and the operating lever 721 to their positions shown in FIG. 29, thus making preparations for the next unloading operation.

Accordingly, the disc loading standby mechanism 600 and the unloading mechanism 700 constructed as described above, move the disc 101 which has been played was made into standby condition in the unloading passage 701. During this standby condition, the next disc 101 is played during which time the former disc 101 is returned to the tray 100. Hence, the time during which playing is not possible is made as short as possible. Further, exchange of the discs 101 is able to be rapidly made.

In the present autochanger type disc player, the disc 101 follow different paths depending on whether a loading operation or an unloading operation is effected. Alternatively, the discs 101 may be caused to follow the common path by providing a standby portion which brings the discs 101 into standby condition during unloading. While one disc 101 is on standby in the standby portion, the next disc 101 may be loaded through the path. Obviously, this alternative configuration yields advantages similar to those obtained by the foregoing structure.

The anchoring portion 601 of the disc temporary standby mechanism 600 impeded the movement of the disc 101 and so the structure is quite simple. Further, no excessively large force is applied to the disc 101.

The unloading mechanism 700 causes the rotating unloading roller 737 to urge the disc 101 into the tray 100. Thus, it is possible to introduce the disc 101 into the tray 100 with certainty without affecting the other discs 101 held in the tray 100 at all. Also, since the disc 101 is rolled into the tray 100, the introduction of the disc 101 is done smoothly.

Further, since the detecting lever 743 is moved while in direct contact with the disc 101, the introduction of the disc 101 into the tray 100 is able to be certainly and correctly sensed.

It is obvious that the invention is not limited to the embodiment specifically described and shown, but rather various modifications and changes may be made thereto without departing from the spirit and scope of the invention.

What is claimed is:

1. An autochanger type disc player for selectively playing stored discs comprising:
    a housing having a disc storage section, a disc playback section, and means for slidably positioning said disc storage section relative to said disc playback section, said disc storage section having means for retaining a plurality of said discs, said disc playback section having means for individually playing said discs and means for holding said playback section in a receive position and an unload position;
    first disc transferring means between said disc storage section and said playback section to allow transfer of said discs from said disc storage section to said receive position, said first disc transferring means including loading means for transmitting a first rotating force to said discs and for guiding said discs along said first disc transferring means, said loading means including pulley means for rotatably engaging the periphery of said discs and a loading member for continuing rotation of said discs within said first disc transferring means and for guiding said discs into said receive position;
    second disc transferring means between said disc storage section and said playback section to allow transfer of said discs from said unload position to said disc storage section, said second disc transferring means including unloading means for transmitting a second rotating force to said discs in a direction of rotation opposite said first rotating force and for guiding said discs into said disc storage section;

means for controlling said disc playback section and said means for slidably positioning said disc storage section, wherein said retaining means is aligned with said second disc transferring means to allow said disc playback section to play discs received from said disc storage section through said first disc transferring means and to return said discs to said disc storage section through said second disc transferring means.

2. The autochanger disc player defined in claim 1, wherein said loading means includes guide rails extending within said first disc transferring means and a loading unit adapted to be mounted for movement along said guide rails, wherein said pulley means is rotatably supported within said loading unit, and wherein said unloading means includes a roller for rotatably engaging said discs.

3. The autochanger type disc player defined in claim 1, wherein said second disc transferring means includes a standby position and wherein said means for slidably positioning said retention means is aligned with said second disc transferring means for receiving each of said discs from said playback section when one of said discs is in said standby position.

4. The autochanger type disc player defined in claim 2, wherein said retention means includes a series of parallel grooves, each of said grooves supporting one of said discs.

5. The autochanger type disc player defined in claim 4, wherein a preselected groove supporting a stored disc is aligned with said first disc transferring means when another one of said discs is in said playback section.

6. The autochanger type disc player defined in claim 5, wherein said loading means positions said disc supported within said preselected groove into said first disc transferring means when said disc received from said playback section is in said standby position.

7. The autochanger type disc player defined in claim 1, wherein said first and second disc transferring means are substantially parallel, said first disc transferring means having an expanded mouth section adjacent said storage section for receiving each of said plurality of stored discs, said second disc transferring means having a parallel end section adjacent said storage section for directing each of said plurality of stored discs into said stored section.

8. The autochanger type disc player defined in claim 1, wherein said second disc transferring means includes an expanded mouth section adjacent said playback section for receiving each of said plurality of stored discs from said unload position.

9. The autochanger type disc player defined in claim 8, wherein said first disc transferring means includes a substantially parallel end section adjacent said playback section for directing each of said plurality of stored discs into said receive position.

* * * * *